(12) United States Patent
Edge

(10) Patent No.: US 9,936,526 B2
(45) Date of Patent: Apr. 3, 2018

(54) SYSTEMS AND METHODS TO AUTHENTICATE A REQUEST TO MODIFY OR ACCESS INFORMATION RELATED TO AN ASSET IN ASSOCIATION WITH A TRANSFER OF MANAGEMENT

(71) Applicant: QUALCOMM Incorporated, San Diego, CA (US)

(72) Inventor: Stephen William Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/170,567

(22) Filed: Jun. 1, 2016

(65) Prior Publication Data

US 2017/0041963 A1 Feb. 9, 2017

Related U.S. Application Data

(60) Provisional application No. 62/201,091, filed on Aug. 4, 2015, provisional application No. 62/201,525, filed on Aug. 5, 2015.

(51) Int. Cl.
*H04W 76/00* (2018.01)
*H04W 4/00* (2018.01)
(Continued)

(52) U.S. Cl.
CPC ......... *H04W 76/007* (2013.01); *H04W 4/008* (2013.01); *H04W 4/021* (2013.01);
(Continued)

(58) Field of Classification Search
CPC ..... H04W 84/12; H04W 12/06; H04W 12/08; H04W 88/08; H04W 48/16; H04W 36/08
See application file for complete search history.

(56) References Cited

U.S. PATENT DOCUMENTS 7,263,076 B1 *  8/2007  Leibovitz ............... H04L 63/10
                                                          370/310
8,120,460 B1 *  2/2012  Zhu ......................... B60R 25/24
                                                          340/5.1

(Continued)

OTHER PUBLICATIONS

International Search Report and Written Opinion—PCT/US2016/043564—ISA/EPO—dated Sep. 23, 2016.

*Primary Examiner* — Dung Hong
(74) *Attorney, Agent, or Firm* — MG-IP Law, P.C.

(57) ABSTRACT

Systems and methods are described to enable management of an asset to be transferred from a first entity to a second entity such that an Information Manager that stores information for the asset can authenticate the management transfer when the second entity requests the Information Manager to access or modify the stored information for the asset. Authentication is enabled using a token assigned to the asset by the Information Manager which is provided to the first entity by the Information Manager, transferred from the first entity to the second entity following the transfer of management and provided to the Information Manager by the second entity to enable authentication of the request by the second entity to access or modify the stored information for the asset. In an embodiment, the asset may be a WiFi access point or Bluetooth beacon and the Information Manager may be a National Emergency Address Manager.

30 Claims, 10 Drawing Sheets

(51) Int. Cl.
  *H04W 4/22* (2009.01)
  *H04W 12/06* (2009.01)
  *H04W 88/08* (2009.01)
  *H04W 4/02* (2018.01)
  *H04W 12/08* (2009.01)
(52) U.S. Cl.
  CPC ............. *H04W 4/22* (2013.01); *H04W 12/06* (2013.01); *H04W 12/08* (2013.01); *H04W 88/08* (2013.01)

(56) References Cited

U.S. PATENT DOCUMENTS

| | | | |
|---|---|---|---|
| 8,990,556 B1* | 3/2015 | Wurster | H04W 12/08 713/158 |
| 2008/0126403 A1* | 5/2008 | Moon | G06F 17/30575 |
| 2010/0220676 A1* | 9/2010 | Grandblaise | H04W 28/18 370/329 |
| 2012/0177022 A1* | 7/2012 | Ichikawa | H04W 48/08 370/338 |
| 2013/0188224 A1* | 7/2013 | Moriyama | G06F 3/1204 358/1.15 |
| 2014/0075523 A1* | 3/2014 | Tuomaala | H04L 63/083 726/6 |
| 2015/0113592 A1 | 4/2015 | Curtis et al. | |
| 2015/0134552 A1 | 5/2015 | Engels et al. | |
| 2015/0139210 A1* | 5/2015 | Marin | H04W 48/16 370/338 |
| 2015/0223068 A1* | 8/2015 | Thelen | H04L 63/083 726/7 |
| 2015/0324186 A1* | 11/2015 | Shin | G06F 8/71 717/170 |
| 2016/0029356 A1* | 1/2016 | Bhanage | H04W 72/0406 370/329 |
| 2016/0077186 A1* | 3/2016 | Snapp | G01S 5/0231 455/404.2 |

* cited by examiner

SYSTEMS AND METHODS TO AUTHENTICATE A REQUEST TO MODIFY OR ACCESS INFORMATION RELATED TO AN ASSET IN ASSOCIATION WITH A TRANSFER OF MANAGEMENT

CLAIM OF PRIORITY UNDER 35 U.S.C. § 119

The present Application for Patent claims priority to Provisional Application No. 62/201,091, entitled "SYSTEMES AND METHODS TO AUTHENTICATE A REQUEST TO MODIFY OR ACCESS INFORMATION RELATED TO AN ASSET IN ASSOCIATION WITH A CHANGE IN MANAGEMENT", filed Aug. 4, 2015, and also to Provisional Application No. 62/201,525, entitled "SYSTEMS AND METHODS TO AUTHENTICATE A REQUEST TO MODIFY OR ACCESS INFORMATION RELATED TO AN ASSET IN ASSOCIATION WITH A CHANGE IN MANAGEMENT", filed Aug. 5, 2015, each of which is by the same inventor as the subject application, assigned to the assignee hereof and hereby expressly incorporated by reference herein in its entirety.

TECHNICAL FIELD

Various embodiments described herein generally relate to authentication of a request to modify or access information related to an asset in association with a transfer of management of the asset.

BACKGROUND

Wireless communication systems are widely deployed to provide various types of communication content such as voice and data. Typical wireless communication systems may be multiple-access systems capable of supporting communication with multiple users by sharing available system resources (e.g., bandwidth, transmit power). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as those defined by the third generation partnership project (3GPP) and the third generation partnership project 2 (3GPP2). For example, wireless communication systems supporting Global System for Mobile communications (GSM), Universal Mobile Telecommunications System (UMTS), Long Term Evolution (LTE) and LTE Advanced (LTE-A) have been defined by 3GPP, whereas systems supporting cdma2000 and high rate packet data (HRPD) have been defined by 3GPP2.

In general, a modern wireless communication system includes support for navigation and location capabilities based on received electronic signals (e.g., satellite signals, base station signals, access point signals, visual light signals, etc.). During emergency situations, a wireless device may be used to connect with public emergency systems, such as by dialing 911 or 112. A wireless communication system may provide location information for a mobile device (e.g., the current location of the mobile device) to assist emergency personnel in dispatching appropriate public safety resources and responding to a distress message.

The Alliance for Telecommunications Industry Solutions (ATIS) Emergency Location Task Force (ELOC) is standardizing support for high accuracy indoor location for E911 calls made in North America. The Federal Communications Commission (FCC) is mandating that network operators provide Heightened Accuracy Location Information (HALO for emergency calls made indoors in the form of either a dispatchable civic location for an emergency caller and/or a geographic location accurate to within 50 meters for an emergency caller when an emergency 911 call is placed from a wireless device via a cellular wireless network such as an LTE network.

To this end, the FCC has mandated that global addresses of assets (e.g., WiFi IEEE 802.11 access points (APs), Bluetooth® Low Energy (BTLE) beacons, small-cells such as pico-cells, femto-cells or home base stations, etc.) together with their dispatchable civic locations and possibly geographic locations be stored in a National Emergency Address Database (NEAD) that can be accessed by any cellular wireless network. The global addresses may correspond to 48-bit Media Access Control (MAC) addresses in the case of WiFi APs and BTLE beacons or to global cell IDs in the case of small cells. A civic location may correspond to a street address or postal address and may include a room, suite, apartment, floor, building identity or other like designation where appropriate. A geographic location (also referred to as geodetic location) may correspond to a latitude, longitude and optionally an altitude (e.g., above or below local ground level or mean sea level). The NEAD may be managed by a National Emergency Address Manager (NEAM) that may provide an interface to external users to support addition, modification and deletion of asset information (e.g., for WiFi APs, BTLE beacons and/or small cells) into the NEAD.

A problem may arise when an asset (e.g., a WiFi AP, BTLE beacon or small cell) is transferred to a new owner or new manager (e.g., because of a sale, because an Enterprise owner is acquired by or merged with another Enterprise or because management of the asset in the NEAD and NEAM is transferred to a new third party manager). In that case, the NEAM may reject an attempt by the new owner or new manager of the asset to access or modify information for the asset because it may be required by the NEAM that only the original owner or original manager of the asset be allowed to retrieve, add, change or delete information for the asset. However, a change to asset information, which may need to be reported to the NEAM, is expected to occur occasionally such as when an asset is moved to a new location, taken out of service or transferred to a new owner or new manager. One solution to this problem may be for the new owner or new manager of an asset, and/or the previous owner or previous manager, to report the transfer of ownership or transfer of management of the asset to NEAM operations personnel by means of Email, mail or phone communication and for the NEAM operations personnel to then perform some modification of asset information (e.g., indicating the change of ownership or management) to enable the new owner or new manager to modify or access information for the asset without a rejection from the NEAM. However, this solution may increase NEAM operations cost and may inconvenience owners and managers of assets, which may in turn deter an owner or manager from updating asset information in the NEAD.

SUMMARY

A first embodiment is directed to operating a first client device associated with a first entity, whereby the first client device sends, to an Information Manager, a request to modify and/or access information related to an asset that is managed by the first entity, the request including an identification for the asset, receives, from the Information Manager, a token that is configured to authenticate a request from a second entity to modify and/or access the information related to the asset, and transfers the token to a second client device associated with the second entity in response to a transfer of management of the asset from the first entity to the second entity.

In the first embodiment, the asset may be a WiFi access point, Bluetooth beacon or small cell base station. The request to modify and/or access information related to the asset may include a request to add, change, retrieve or delete a civic location of the asset, a geodetic location of the asset, information for a managing entity of the asset, information for an owning entity of the asset, an authorization to transfer management of the asset or some combination thereof. The Information Manager may be a National Emergency Address Manager (NEAM). The token may be uniquely assigned by the Information Manager to the asset. The token may be a number, a name or a character string. A copy of the token may be maintained by the Information Manager. The first embodiment may further include pre-authorizing with the Information Manager a transfer of management of the asset prior to receiving the token. The transfer of management of the asset from the first entity to the second entity may correspond to a change in ownership of the asset from the first entity to the second entity.

A second embodiment is directed to a first client device associated with a first entity, whereby the first client device receives, from a second client device associated with a second entity that manages an asset, a first token in response to a transfer of management of the asset from the second entity to the first entity, wherein the first token is assigned by an Information Manager; and sends, to the Information Manager, the first token and a request to modify and/or access information related to the asset, the request including an identification for the asset, wherein the first token enables the Information Manager to authenticate the request.

In the second embodiment, the asset may be a WiFi access point, Bluetooth beacon or small cell base station. The request to modify and/or access information related to the asset may include a request to add, change, retrieve or delete a civic location of the asset, a geodetic location of the asset, information for a managing entity of the asset, information for an owning entity of the asset, authorization to transfer management of the asset, or some combination thereof. The first token may be uniquely assigned by the Information Manager to the asset. The first token may be a number, a name or a character string. The second embodiment may further include receiving a second token that replaces the first token in response to the sending, wherein the first entity is pre-authorized to transfer management of the asset to a third entity. The second embodiment may further include revoking the first token without obtaining a second token in response to the sending, wherein the first entity is not pre-authorized to transfer management of the asset to a third entity. The transfer of management of the asset from the second entity to the first entity may correspond to a change in ownership of the asset from the second entity to the first entity.

A third embodiment is directed to an Information Manager, whereby the Information Manager sends, to a first client device associated with a first entity while an asset is managed by the first entity, a token that is configured to authenticate one or more requests from a second entity to modify and/or access information related to the asset, receives, from a second client device associated with the second entity, the token and a request to modify and/or access the information related to the asset, the request including an identification for the asset and authenticates the request based on the token.

In the third embodiment, the sending may send the token in response to another request from the first client device that requests modification and/or access to the information related to the asset when managed by the first entity, the request including an identification for the asset. The asset may be a WiFi access point, Bluetooth beacon or small cell base station. The request to modify and/or access information related to the asset may include a request to add, change, retrieve or delete a civic location of the asset, a geodetic location of the asset, information for a managing entity of the asset, information for an owning entity of the asset, authorization to transfer management of the asset, or some combination thereof. The Information Manager may be a NEAM. The token may be uniquely assigned by the Information Manager to the asset. The token may be a number, a name or a character string. A copy of the token may be maintained by the Information Manager. The third embodiment may further include pre-authorizing with the first entity a transfer of management of the asset prior to sending the token. The request may be received in response to a transfer of management of the asset from the first entity to the second entity. The transfer of management of the asset from the first entity to the second entity may correspond to a change in ownership of the asset from the first entity to the second entity. The third embodiment may further include notifying the first entity of the authenticating. The third embodiment may further include updating the information related to the asset in a database based on the request in response to the authenticating.

With respect to the third embodiment, the Information Manager and the first and second client devices may communicate over a first interface, the database and at least one core network may communicate over a second interface to facilitate dissemination of asset-related information from the database to the at least one core network, and the first and second interfaces may use respective message body interface components with one or more common parameters. The one or more common parameters may include an asset address field, a civic location field, a geodetic location field, an error/success code field and/or any combination thereof. In an example, the one or more common parameters may include the asset address field, and the asset address field may map to a 48-bit Media Access Control (MAC) address. In another example, the one or more common parameters may include the civic location field, and the civic location field may be defined by a Presence Information Data Format Location Object (PIDF-LO) in Internet Engineering Task Force (IETF). In another example, the one or more common parameters may include the geodetic location field, and the geodetic location field is defined by the PIDF-LO in IETF or 3rd Generation Partnership Project (3GPP) Technical Specification (TS) 23.032.

BRIEF DESCRIPTION OF THE DRAWINGS

A more complete appreciation of embodiments of the disclosure will be better understood by reference to the following detailed description when considered in connection with the accompanying drawings which are presented solely for illustration and not limitation of the invention, and in which.

DETAILED DESCRIPTION

Figure 1:
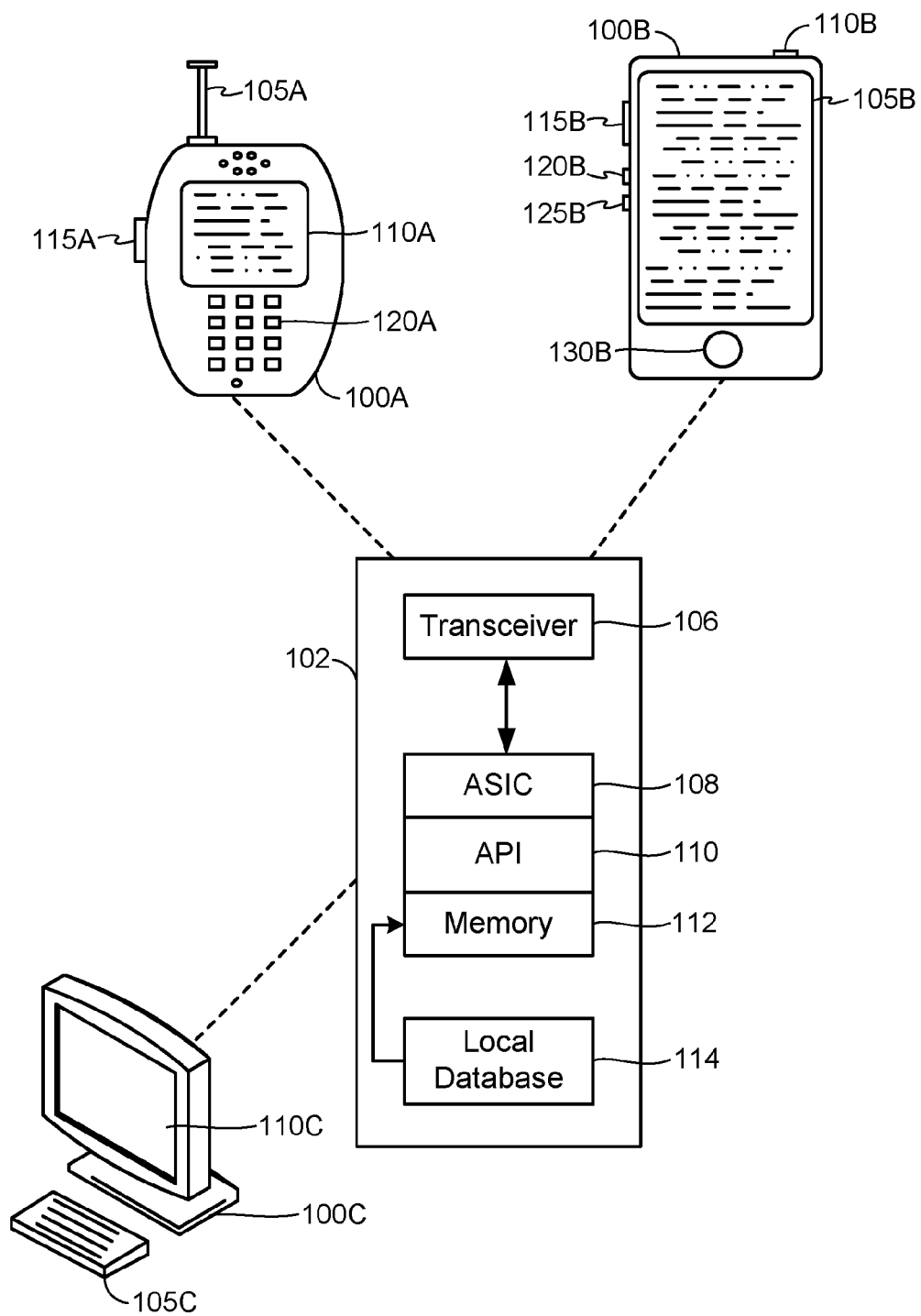
FIG. 1 illustrates examples of client devices in accordance with embodiments of the disclosure.

One or more embodiments described below are related to authentication of a request to access or modify information related to an asset in association with a transfer of (or change in) management or ownership of the asset. For convenience, the embodiments are sometimes described in terms of supporting a transfer of management of an asset but are to be understood as applying equally to a transfer of (or change in) ownership of an asset and to a transfer of (or change in) both ownership and management of an asset. As will be discussed in more detail below, an Information Manager (e.g., a National Emergency Address Manager (NEAM), or a combination of the NEAM and a National Emergency Address Database (NEAD)) interfaces with external entities that are responsible for managing information related to assets (e.g., WiFi access points (APs), Bluetooth Low Energy (BTLE) beacons, small cells such as pico-cells, femto-cells or home base stations) that are available to assist the location of emergency calls from one or more user equipments (UEs) in a wireless communications system. The Information Manager distributes a token to a first client device associated with a first entity that manages a first asset, and the Information Manager can later authenticate a request by a second client device associated with a second entity to access or modify information related to the first asset based on the token.

In some further detail, transfer of management or ownership of an asset may be enabled using the following steps, which are elaborated in more detail further on herein.

P1. The initial owner or manager of an asset indicates to the Information Manager whether transfer of ownership or management of the asset is allowed.

P2. When transfer of ownership or management of the asset is allowed, the Information Manager provides a token to the initial owner or manager for the asset and stores the token in association with other information for the asset.

P3. When the initial owner or manager transfers ownership or management of the asset, the token is provided by the initial owner or manager to the new owner or manager.

P4. The new owner or manager provides the token when requesting to add, modify, delete or access information for the asset in the Information Manager.

P5. If the token matches the Information Manager's record for the asset, the request to add, modify, delete or access information for the asset is authenticated (e.g., is allowed).

P6. The Information Manager may optionally notify the initial owner or initial manager of the transfer of ownership (e.g., via Email) so that any error (or deliberate falsification) can be corrected by the initial owner or manager.

The token referred to in the above steps could be a number, a name, a digit string or a character string assigned by the Information Manager and may further be unique (e.g., different to any other token assigned by the Information Manager for any other asset). If the initial owner or manager forgets the token, the initial owner or manager may retrieve the token from the Information Manager—e.g., after being authenticated by the Information Manager. This procedure may provide a high probability that an asserted transfer of ownership is correct and thereby may reduce interaction between Information Manager operations personnel and asset owners and managers.

An asset as referred to herein may be any tangible or intangible property, object or entity that is owned by some other entity such as (but not limited to) a company, person, trust, corporation, government, country and may be managed by the owning entity or by some other entity (such as a person, organization, trust or company) on behalf of the owning entity. An asset can include (but is not limited to), physical objects (e.g., office furniture, factory plant, buildings, vehicles, houses, hotels, communications equipment), intangible objects (e.g., copyrights, film rights, patents, trademarks, information) and combinations of these (e.g., books, papers, film). Although many of the examples of assets described herein relate to communications equipment and specifically WiFi APs, BTLE beacons and small cells, the techniques and procedures described herein should be understood as applying to assets in the widest sense of their meaning.

FIG. 1 illustrates examples of client devices in accordance with embodiments of the disclosure. Referring to FIG. 1, a platform 102 can be deployed on a variety of client device types. The platform 102 can include a transceiver 106 (e.g., a wireless transceiver for a wireless client device type such as a phone, laptop or tablet computer, a wired transceiver for a non-wireless client device type such as a desktop computer or network server, etc.) operably coupled to an application specific integrated circuit (ASIC) 108, or other processor, microprocessor, logic circuit, or other data processing device. The ASIC 108 or other processor executes the application programming interface (API) 110 layer that interfaces with any resident programs in the memory 112 of the client device. The memory 112 can be comprised of read-only or random-access memory (RAM and ROM), EEPROM, flash cards, or any memory common to computer platforms. The platform 102 also can include a local database 114 that can store applications not actively used in memory 112, as well as other data. The local database 114 is typically flash memory, but can be any secondary storage device as known in the art, such as magnetic media, EEPROM, optical media, tape, soft or hard disk, or the like.

Referring to FIG. 1, an external casing of a client device 100A (e.g., a cellular telephone) is configured with an antenna 105A, display 110A, at least one button 115A (e.g., a Push to Talk (PTT) button, a power button, a volume control button, etc.) and a keypad 120A among other components, as is known in the art. An external casing of a client device 100B (e.g., a cellular telephone with a touchscreen, a smartphone, a tablet computer, etc.) is configured with a touchscreen display 105B, peripheral buttons 110B, 115B, 120B and 125B (e.g., a power control button, a volume or vibrate control button, an airplane mode toggle button, etc.), at least one front-panel button 130B (e.g., a Home button, etc.), among other components, as is known in the art. A client device 100C (e.g., a desktop computer or workstation, etc.) is coupled to a user interface (UI) that includes a keyboard 105C and a display screen 110C.

Figure 2:
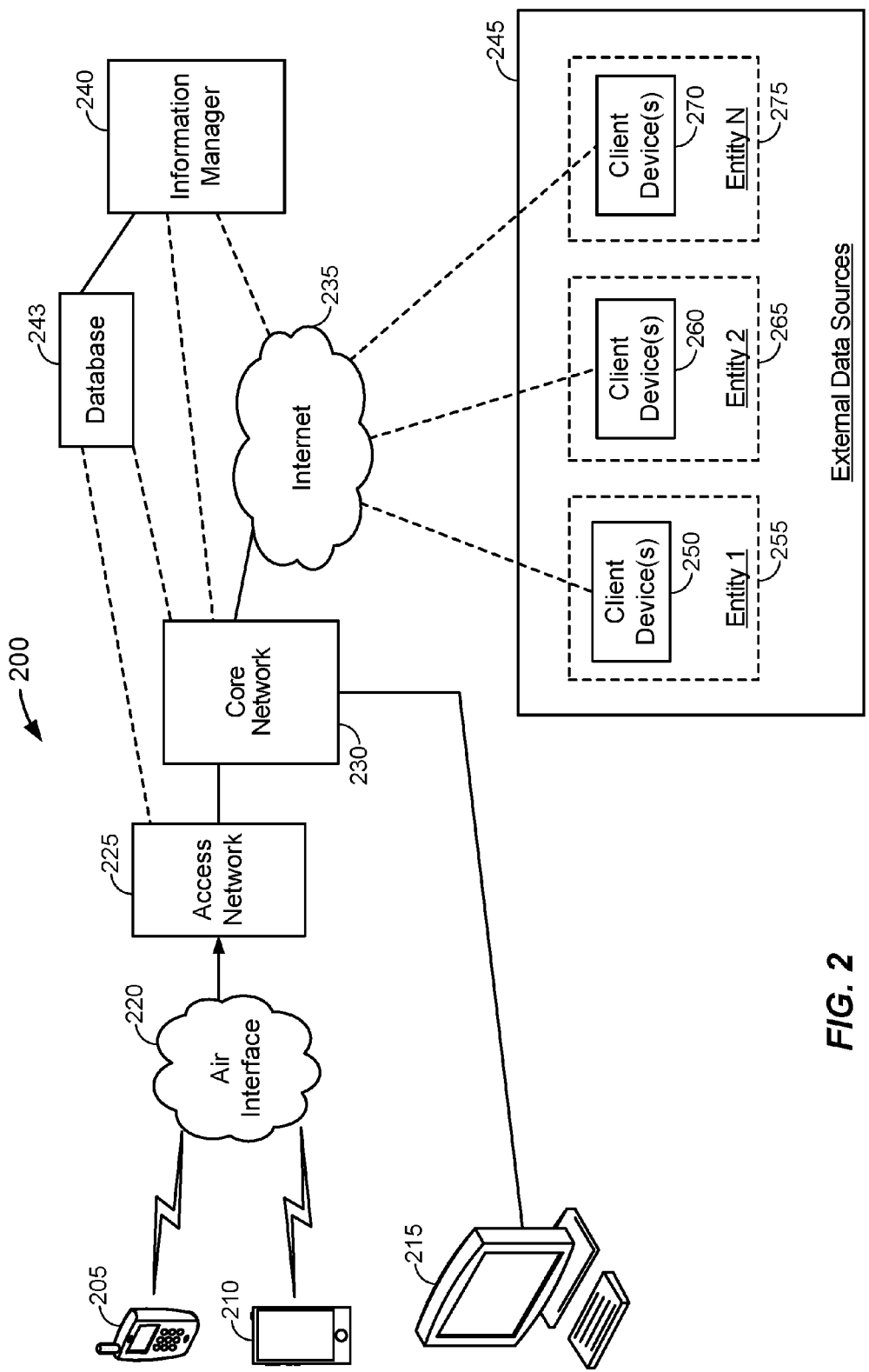
FIG. 2 illustrates a high-level system architecture of a communications system in accordance with an embodiment of the disclosure.

FIG. 2 illustrates a high-level system architecture of a communications system 200 in accordance with an embodiment of the disclosure. The communications system 200 contains wireless capable user equipments (UEs) 205, 210 and 215. The UEs 205, 210 and 215 can include cellular telephones, personal digital assistant (PDAs), pagers, smartphones, a laptop computer, a desktop computer, and so on (e.g., see client device examples from FIG. 1). For example, in FIG. 2, UEs 205 and 210 are illustrated as cellular calling phones, and UE 215 is illustrated as a desktop computer or PC. The UEs 205, 210 and 215 may be different examples of the platform 102.

Referring to FIG. 2, UEs 205 and 210 are configured to communicate with an access network 225 over a wireless communications interface, shown in FIG. 2 as air interface 220 while UE 215 connects to the core network 230 via a direct wired connection. The air interface 220 can comply with a particular cellular communications protocol or set of protocols (e.g., cdma2000, HRPD, GSM, UMTS, LTE, LTE-A etc.), or a wireless local area network (WLAN) protocol or set of protocols (e.g., IEEE 802.11, BTLE). The access network 225 may include a plurality of base stations, access points and/or beacons (e.g., macro-cells such as cellular base stations, small cells such as pico APs, femto APs or home base stations, WiFi APs, BLTE beacons, etc.) that serve UEs over air interfaces, such as the air interface 220. The base stations, access points and/or beacons in the access network 225 can be referred to as access nodes or ANs, access points or APs, base stations or BSs, Node Bs, eNode Bs, and so on, depending on air interface 220 and may be referred to collectively and generically as access points (APs) or reference points (RPs). These access points can be terrestrial access points (or ground stations), or satellite access points. The access network 225 is configured to connect to a core network 230 that can perform a variety of functions, including routing and connecting circuit-switched (CS) calls between UEs served by the access network 225 and other UEs served by the access network 225 or by a different access network altogether, and can also mediate an exchange of packet-switched (PS) data with external networks such as Internet 235. The Internet 235 includes a number of routing agents and processing agents (not shown in FIG. 2 for the sake of convenience). While not shown expressly in FIG. 2, UEs can connect to the Internet 235 directly (i.e., separate from the core network 230, such as over an Ethernet connection of WiFi or 802.11-based network). The Internet 235 can thereby function to route and connect packet-switched (PS) data communications between UEs via the core network 230.

Referring to FIG. 2, an Information Manager 240 is shown with optional connections to the core network 230 and the Internet 235. The Information Manager 240 can be embodied as a single server or a distributed network of servers. In an example, the Information Manager 240 can be configured to host the functionality of the NEAM, or alternatively both the NEAM and the NEAD. The Information Manager 240 is depicted in FIG. 2 as connected to a database 243 that is managed by the Information Manager 240. The database 243 can correspond to the NEAD, in an example. However, as noted above, the Information Manager 240 can collectively correspond to the combination of the NEAM and NEAD in other example implementations, in which case the database 243 could be integrated within the Information Manager 240 as opposed to being a separate entity as depicted in FIG. 2. The database 243 is depicted in FIG. 2 as connected to the Information Manager 240 and to one or both of the access network 225 and core network 230. The Information Manager 240 is generally configured to manage modification to and/or retrieval of information in the database 243 related to assets. As used herein, an "asset" (alternately referable as a reference point) can correspond to any device that is configured to facilitate emergency calls with UEs in a communication system, including but not limited to WiFi access points (APs), Bluetooth Low Energy (BTLE) beacons and small-cell APs such as pico-cells or femto-cells.

In some implementations, the database 243 may be partitioned into two or more logically and/or physically separate portions that may each be dedicated to storing different types of data. For example, in these implementations a first portion of the database 243 may be dedicated to storing information related to assets and may, in some implementations, correspond to the NEAD 430 and/or NEAD 510 described later. A second portion of the database 243 may be dedicated to storing information related to external data sources (e.g. entities 255, 265, 275 and/or client devices 250, 260, 270) and may, in some implementations, be part of the Information Manager 240 or NEAM 435 or NEAM 512 described later. A third portion of the database 243 may be dedicated to storing information related to both assets and the external data sources which own or manage the assets (e.g. entities 255, 265, 275 and/or client devices 250, 260, 270). As an example, the third portion of the database 243 may store records of data addition, modification, deletion and/or retrieval by external data sources for the assets they manage or own. In some implementations, the third portion of the database 243 may be part of the Information Manager 240 (or NEAM 435 or NEAM 512 described later), or may correspond to or be part of the NEAD 430 and/or NEAD 510 described later.

Figure 3:
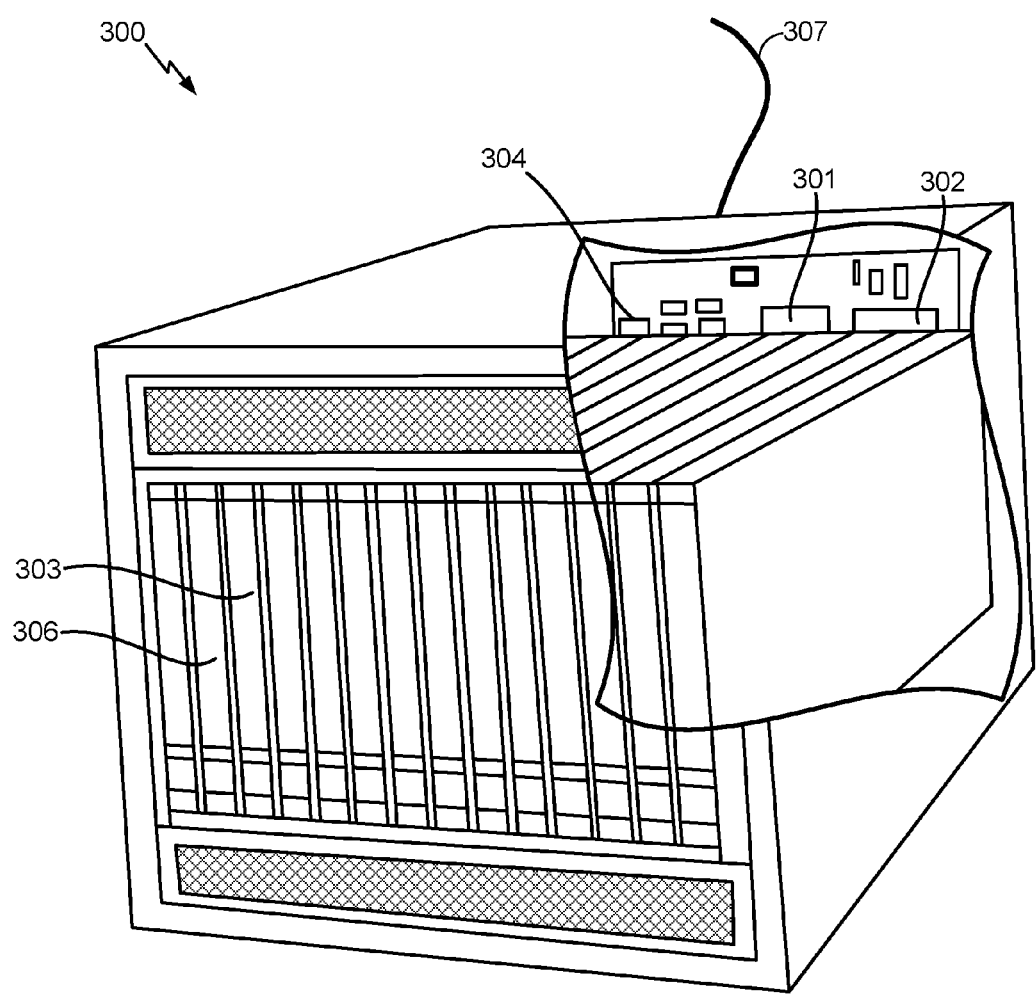
FIG. 3 illustrates a server in accordance with an embodiment of the disclosure.

Turning to FIG. 3, an example implementation of the Information Manager 240, the database 243 and/or the client devices 250, 260 and 270 as a server 300 is depicted in accordance with an embodiment of the disclosure. In FIG. 3, the server 300 includes a processor 301 coupled to volatile memory 302 and a large capacity nonvolatile memory, such as a disk drive 303. The server 300 may also include a floppy disc drive, compact disc (CD) or DVD disc drive 306 coupled to the processor 301. The server 300 may also include network access ports 304 coupled to the processor 301 for establishing data connections with a network 307 (and with other remote entities via the network 307), such as a local area network coupled to other broadcast system computers and servers or to the Internet. For example the network 307 may correspond to the Internet 235 or core network 230 in FIG. 2. The server 300 may further include or be connected to an input device (e.g. keypad, mouse, touchscreen) and/or an output device (e.g. monitor, graphical user interface) that are not shown in FIG. 3

Turning back to FIG. 2, Information Manager 240 is configured to be accessed by external data sources 245 (or clients). The external data sources 245 include sets of client devices 250, 260 and 270 which are associated with (e.g. belong to or act on behalf of) different entities 255, 265 and 275, respectively. For example, a first entity 255 may correspond to Verizon Wireless, with the set of client devices 250 including one or more computers that are assigned to Verizon Wireless administrative users, while a second entity 265 may correspond to AT&T, with the set of client devices 260 including one or more computers that are assigned to AT&T administrative users, and so on. As another example, a third entity 275 may correspond to a large hotel chain or to an owner of many shopping malls, with the set of client devices 270 including one or more computers that are assigned to administrative users for this hotel chain or shopping mall owner. In an alternative example, entities can also correspond to individuals or small organizations with little to no Information Technology (IT) resources. One or more of client devices 250, 260, 270 may be examples of the platform 102 and/or of the server 300.

An entity such as entity 255, 265 and 275 may manage one or more assets by modifying and retrieving data for these assets via interaction with the Information Manager 240. As remarked previously, an entity 255, 265 or 275 may be the owner of some or all of the assets that are managed by the entity, but this does not have to be the case and the owner of some or all of the assets may be another entity. As an example, first entity 255 may manage a set of assets S1 which are owned by second entity 265 and may manage another set of assets S2 that are owned by first entity 255. In addition, the set of assets S1 in this example could also be managed by the second entity 265 (the owner of the assets S1) as well as by the first entity 255 and possibly by one or more further entities (e.g. the third entity 275). The management of assets by an entity may be accomplished physically by the client devices 250, 260 and 270 which provide the resources (e.g. computer work station, PC, computer server) to access the Information Manager 240 and modify and retrieve data for the assets being managed. Thus, the external data sources 245 may interact with the Information Manager 240 via the client devices 250, 260 and 270 in order to modify and/or retrieve data associated with assets. The interaction between the external data sources 245 and the Information Manager 240 may be facilitated by a human operator who is controlling a client device (e.g. as supported by Component A described next in Table 1) or may be entirely automatic using machine-to-machine electronic communication between a client device and the Information Manager 240 (e.g. as supported by Component C in Table 1). Examples of interface components by which the external data sources 245 may connect to and/or interact with the Information Manager 240 are depicted in Table 1 (below).

TABLE 1

Information Manager Interface Component Examples

| Interface Component | Possible Functions of an Interface Component |
| --- | --- |
| Component A: Website | Enable Internet browser access by users (e.g. a user accessing a client device) using standard HTTP; Enable collection of user information (name, address, Email etc.); |

TABLE 1-continued

Information Manager Interface Component Examples

| Interface Component | Possible Functions of an Interface Component |
| --- | --- |
| | For first time user access, provide a logon name and password and/or an authentication key for application protocol access (component C); Enable addition/modification/deletion of data for assets by filling in fields on a webpage; Enable users to view previously provided data for assets; Enable users to add, retrieve or modify data for many assets by downloading or uploading a file (formatted according to component B). |
| Component B: Message Body | Provide a common message or file format for transferring data for one or more assets; Enable addition, modification deletion and retrieval of data for assets; Format of message body could be defined using XML; Can be manually uploaded or download via the website (component A) or transferred using the application protocol (component C). |
| Component C: Application Protocol | Use to transfer (add, modify or retrieve) asset data (using the message body of component B) from a client device to the Information Manager 240 (e.g., to add, modify or delete asset data) or from the Information Manager 240 to a client device (e.g., to retrieve asset data); Identify the client device or the entity associated with the client device (if not supported by a lower protocol layer); Support authentication/ciphering (if not supported by a lower layer protocol layer). |

As will be appreciated, different entities and their associated client devices may opt to use different component types to connect to and/or interact with the Information Manager 240. For example, an entity corresponding to a large telecommunications company with significant IT resources may prefer to use a message body component type (e.g., component B in Table 1) in conjunction with either a website component (e.g., component A in Table 1) or an application protocol (e.g., component C in Table 1) so that information for a large number of assets can be modified and/or retrieved in a completely automated or partially automated manner. In contrast, an entity corresponding to an individual user or small company with fewer or no IT resources may opt to use a website component type (e.g., component A in Table 1) with manual entry of asset data using a webpage.

It is noted that UEs 205, 210 and 215 in FIG. 2 may also access the Information Manager 240 via the core network 230 or via the core network 230 and Internet 235 in order to modify and/or retrieve data for assets. It is further noted that access network 225 and/or core network 230 may be able to retrieve data for assets from database 243. As an example, the assets for which information is added and/or modified in Information Manager 240 by external data sources 245 may correspond to WiFi APs, BTLE beacons and/or small cells owned or managed by the external data sources 245. In addition in this example, the information for these assets may correspond to their global addresses (e.g., MAC addresses and/or global cell IDs) and their civic and/or geographic locations. In that case, if the information for the assets is configured by Information Manager 240 in database 243, core network 230 or access network 225 (e.g., a location server in access network 225 or core network 230) may retrieve some of this information in order to help determine the location (e.g., a dispatchable civic location or a geographic location) of a UE that is making an emergency call. As an example, if UE 205 instigates an emergency call (e.g., in response to the user of UE 205 dialing "911") and the UE 205 subsequently interacts with a location server in core network 230 to enable the location server to obtain a current location for UE 205 and transfer the location to a Public Safety Answering Point (PSAP), UE 205 may provide the location server with the global addresses (or public addresses) of one or more WiFi, BTLE or small cell APs visible to UE 205. The location server may then query database 243 with the global address(es) provided by UE 205 and receive back from database 243 the associated civic and/or geographic location(s) of the AP(s), which may then be used by the location server to determine a location for UE 205 and/or may be provided by the location server to a PSAP to which the emergency call was routed. In this example, having the information for the AP(s) (e.g., global address(es), civic location(s), geographic location(s)) configured by external data sources 245 in Information Manager 240 may be a critical prerequisite for being able to accurately locate the UE 205 for the emergency call.

Figure 4:
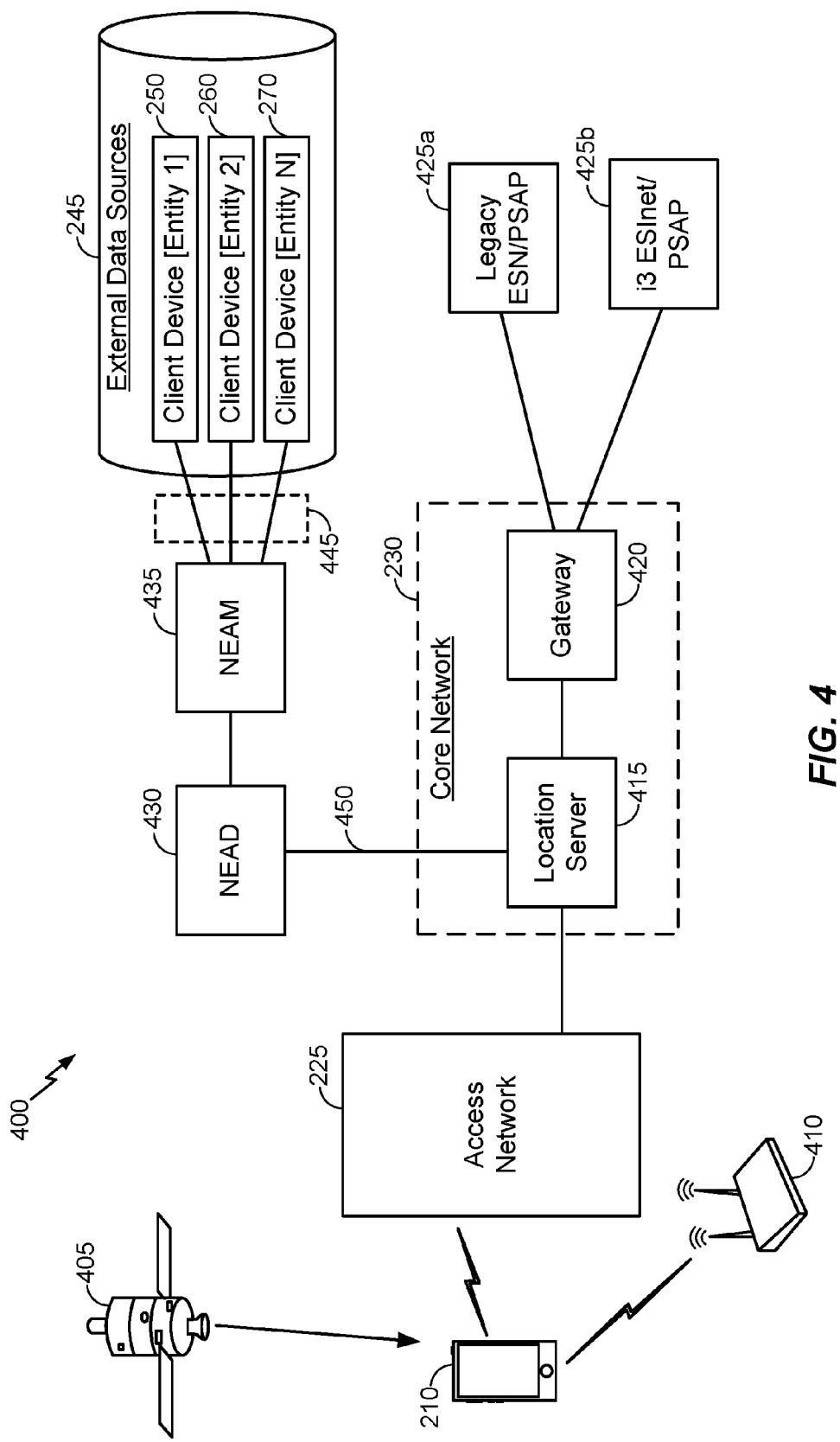
FIG. 4 illustrates a wireless communications system, which is a more detailed implementation example of the communications system of FIG. 2 in accordance with an embodiment of the disclosure.

FIG. 4 illustrates a wireless communications system 400, which is a more detailed implementation example of the communications system 200 of FIG. 2 in accordance with an embodiment of the disclosure. In FIG. 4, UE 210 is configured to monitor satellite position signals from one or more Satellite Positioning System (SPS) satellites 405 (e.g., such as GPS, Galileo and/or Glonass and also referred to as Global Navigation Satellite Systems (GNSSs)) and to connect to the access network 225. In this example, an asset 410 is nearby to the UE 210 (e.g. within 100 meters of the UE 210). The asset 410 may correspond to (i) a small cell such as a pico AP, femto AP or home base station, (ii) a WiFi AP or (iii) a BLTE beacon. The asset 410 may be one of the assets that are managed by the Information Manager 240 and/or by the NEAM 435 in FIG. 4 (which may correspond to Information Manager 240). Further, in some implementations, asset 410 may be part of access network 225 and may enable connection of UE 210 to access network 225 and/or to core network 230.

Referring to FIG. 4, UE 210 may obtain location measurements that may include (i) SPS measurements (e.g. pseudo-ranges or code phase differences) based on SPS signals received from SPS 405, (ii) measurements (e.g. signal strength, signal to noise ratio, time of arrival and/or time difference of arrival) of signals received from base stations and/or APs in access network 225, and/or (iii) measurements (e.g. signal strength, angle of arrival and/or round trip signal propagation time) of signals received from WiFi APs, small cells and/or BTLE beacons such as asset 410. UE 210 may then provide the location measurements to a location server 415 in the core network 230 (or in the access network 225, not shown in FIG. 4) to compute a location estimate for the UE 210 based on the location measurements. Alternatively, UE 210 may compute a location estimate itself for UE 210 based on the location measurements and possibly based also on assistance data provided by the location server 415 (e.g., such as orbital and timing data for GNSS satellites, the precise location coordinates and transmission timing of base stations and APs in access network 225 and/or the precise location coordinates of WLAN APs, BTLE beacons and/or small cells such as asset 410).

The location server 415 may support location services for UEs, such as UE 210, communicating with the core network 230 (e.g., including UEs roaming to serving core network 230) and may or may not require the UEs to have a service subscription or a prior relationship to the location server 415 or the core network 230. The core network 230 may also include a gateway 420 configured to support messaging with Public Safety Access Points (PSAPs) such as a legacy Emergency Services Network (ESN)/PSAP 425a and an i3 Emergency Services IP network (ESInet)/PSAP 425b.

Location server 415 may correspond to an Enhanced Serving Mobile Location Center (E-SMLC) as defined by 3GPP, an Emergency Secure User Plane Location (SUPL) Location Platform (E-SLP) as defined by the Open Mobile Alliance (OMA) or a Standalone Serving Mobile Location Center (SAS) as defined by 3GPP. Location server 415 may support a control plane location solution (e.g., if location server 415 is an E-SMLC or SAS) or a user plane location solution such as the OMA SUPL solution (e.g., if location server 415 is an E-SLP). Location server 415 may interact with UE 210 to (i) transfer assistance data to UE 210, to assist UE 210, to make location related measurements and/or to compute a location estimate from such measurements, (ii) request location related measurements and/or a location estimate from UE 210 and/or (iii) receive location related measurements and/or a location estimate from UE 210. Location server 415 may compute a location estimate (e.g., latitude, longitude and possibly altitude) for UE 210 from location related measurements (also referred to as location measurements) received from UE 210. Location server 415 may interact with UE 210 using one or more of a number of different protocols including (i) the LTE Positioning Protocol (LPP) defined by 3GPP in 3GPP Technical Specification (TS) 36.355, (ii) LPP Extensions (LPPe) defined by OMA in OMA TS OMA-TS-LPPe-1_0 and in OMA TS OMA-TS-LPPe-2_0, (iii) Positioning Calculation Application Part (PCAP) plus Radio Resource Control (RRC) for UMTS defined by 3GPP in 3GPP TSs 25.453 and 25.331, respectively, (iv) SUPL UserPlane Location Protocol (ULP) defined by OMA in OMA TS OMA-TS-ULP-V2_0_3, and/or (v) LTE Positioning Protocol A (LPPa) plus Radio Resource Control (RRC) for LTE defined by 3GPP in 3GPP TSs 36.455 and 36.331, respectively. For example, UE 210 and location server 415 may interact using LPP combined with LPPe when location server 415 is an E-SMLC or E-SLP.

Gateway 420 may correspond to a Gateway Mobile Location Center (GMLC) or a Location Retrieval Function (LRF) as both defined by 3GPP and may instigate positioning of UE 210 via location server 415, e.g., when gateway 420 receives a location request for UE 210 from legacy ESN/PSAP 425a or i3 ESInet/PSAP 425b. Gateway 420 may then receive location information for UE 210 (e.g., that may comprise a dispatchable civic location and/or a geographic location) from location server 415 via one or more intermediate entities in serving core network 230 or directly from location server 415 and may send the location information to legacy ESN/PSAP 425a or i3 ESInet/PSAP 425b.

Location server 415, gateway 420 or some other entity in core network 230 may query a NEAD 430 (e.g., an example of the database 243 from FIG. 2) for a dispatchable civic location for UE 210. For example, UE 210 may provide location server 415 with the global and/or public identities (e.g., MAC addresses) of one or more assets (e.g., small-cells such as pico APs or femto APs, WiFi APs, BLTE beacons, etc.) visible to UE 210, such as asset 410, and location server 415 or some other entity in the core network 230 may provide these identities to NEAD 430. NEAD 430 may then search a database of known assets (e.g., small-cells such as pico APs or femto APs, WiFi APs, BLTE beacons, etc.) for which corresponding civic location information (e.g., a street address and/or building designation, floor level and possibly room or apartment number) was previously configured (e.g. by NEAM 435) and may return a civic location for each of one or more of the identified APs, such as asset 410. Location server 415 may then determine one civic location returned by NEAD 430 to be a most likely civic location for UE 210 (e.g. based on signal measurements for the AP whose civic location it is that indicate close proximity of the AP to UE 210). Location server 415 may treat this most likely civic location as a dispatchable location for UE 210 in the sense of being usable by a PSAP (e.g. legacy ESN/PSAP 425a or i3 ESInet/PSAP 425b) to dispatch public safety assistance (e.g. fire, police or ambulance) to the precise location of UE 210. This dispatchable civic location may, for example, then be transferred to gateway 420 as part of location information for UE 210 and may then be transferred by gateway 420 to legacy ESN/PSAP 425a or i3 ESInet/PSAP 425b.

The NEAD 430 may receive operations, administration, maintenance and provisioning functions from NEAM 435 (e.g., an example of the Information Manager 240 from FIG. 2). The NEAM 435 may receive civic (or dispatchable) location information for assets such as asset 410 from one or more external data sources 245. As discussed above, the external data sources 245 may correspond to an operator, user or organization that owns, manages or operates one or more assets (or reference points such as WiFi and BTLE APs) that may form part of one or more access networks. The civic location information that is provided may correspond to civic location information for the reference points that are owned, managed or operated. In an example, the external data sources 245 may have unique identities that can be authenticated by the NEAM 435 and may establish some minimum level of trust in order to receive authorization to provide civic location information. The NEAM 435 may be configured to support identification and authentication of external data sources, validation of received civic location information, and provisioning of civic and possibly geographic location information in the NEAD 430.

In at least one example implementation, an interface 445 between the NEAM 435 and the one or more external data sources 245 and an interface 450 between the location server 415 and the NEAD 430 may be commonly supported. For example, the message body (component B) may be used to support the interface 445 consistent with the above-description provided with respect to Table 1, and the message body (component B) may further be used to support the interface 450 because the message body (component B) may contain information configured to be used by a query or request to the NEAD 430 by the location server 415 and also for a response from the NEAD 430 back to the location server 415. In a specific example, the message body (component B) could convey, and define the encoding of, the following parameters, for each asset (e.g. each WiFi AP or BTLE beacon) that is referenced, for use on the interfaces 445 and 450:

Asset Address (e.g., 48-bit MAC address);
Civic Location (e.g., using the definition of civic location for the Presence Information Data Format Location Object (PIDF-LO) defined by the Internet Engineering Task Force (IETF));
Geodetic Location (e.g. using the definition of a geodetic location for a PIDF-LO according to the IETF or the definition of a geographic location according to 3GPP TS 23.032); and
Error/Success Codes (e.g. using a common set of codes for both interfaces 445 and 450, or separate codes for each interface).

The message body (component B) could be conveyed (e.g., encapsulated) by the application protocol (component C) for both interface 445 (as described above with respect to Table 1) and also interface 450. A common application protocol (component C in Table 1) could be used for both interfaces 445 and 450. Such a common application protocol could use the same or different transport protocols (e.g., Transmission Control Protocol/Internet Protocol (TCP/IP)) and security protocols (e.g., Transport Layer Security (TLS)) at lower layers for each of the interfaces 445 and 450. Alternatively, different application protocols can be used over interfaces 445 and 450 while conveying the same message body (component B). Either way, some or all of the application protocol support for interfaces 445 and 450 can be common (or standardized) through use of a common message body (component B).

In an XML-specific example, an XML definition of the message body (component B) may be implemented by importing an XML definition of civic location (e.g., which may contain many fields) and/or an XML definition of geodetic location (e.g., which may contain at least a few fields) from an IETF PIDF-LO standard (e.g. IETF RFC 5774 or RFC 6848).

A common message body (component B) that is usable on the interface 445 by the one or more external data sources 245 (e.g. usable by client devices 250, 260 and 270) to add, modify, delete and/or retrieve asset data in the NEAM 435 (using either a webpage (component A) or an application protocol (component C)) and is usable on the interface 450 by the location server 415 to query and receive asset data from the NEAD 430 which may reduce complexities associated with standardization and/or may lower implementation costs (e.g. for the location server 415, NEAD 430, NEAM 435 and/or client devices 250, 260 and 270). Table 2 (below) illustrates an example of how the different parameters for the message body (component B) may be conveyed (for each asset that is referenced) by different application protocol messages (component C). In Table 2 (below), an "M" indicates that the presence of a parameter is mandatory, a "C" indicates the presence of a parameter is conditional (or optional), and a blank indicates a parameter that is not present. Notes 1 to 5 below Table 2 clarify conditions for including certain parameters in a message body (component B) or the significance of not including certain parameters.

TABLE 2

Example Message Body (Component B) Parameter Content for different Application Protocol Messages

| Interface: Direction | Message | Asset Address | Civic Location | Geodetic Location | Error Code or Success Code |
|---|---|---|---|---|---|
| Interface 445: Client device 250/260/270 to NEAM 435 | Add Asset Data | M | M | C *(Note 1) | |
| | Modify Asset Data | M | C *(Note 1) | C *(Note 1) | |
| | Delete | C | | | |

TABLE 2-continued

Example Message Body (Component B) Parameter Content
for different Application Protocol Messages

| Interface: Direction | Message | Asset Address | Civic Location | Geodetic Location | Error Code or Success Code |
|---|---|---|---|---|---|
| | Asset Data Retrieve | *(Note 2) C | | | |
| | Asset Data | *(Note 2) | | | |
| Interface 445: NEAM 435 to Client device 250/260/270 | Response to Add/Modify/Delete Asset Data | C *(Note 3) | | | M |
| | Response to Retrieve | C *(Note 3) | C *(Note 4) | C *(Note 4) | C *(Note 5) |
| Interface 450: Location Server 415 to NEAD 430 | Query for Asset Data | M | | | |
| Interface 450: NEAD 430 to Location Server 415 | Response | M | C *(Note 4) | C *(Note 4) | C *(Note 5) |

(Note 1):
include if available and being added or modified (e.g. for asset data modification, absence of a parameter can indicate no change).
(Note 2):
absence of an asset address could signify a request applicable to all assets owned or managed by an entity.
(Note 3):
include if present in the corresponding request.
(Note 4):
include if configured for the asset in the NEAD 430.
(Note 5):
include an error code in case of an error.

As an example of the content of a message body (component B) shown in Table 2, a response to a retrieve request sent on interface 445 from NEAM 435 to a client device 250, 260 or 270 is shown in the seventh ($7^{th}$) row for the second ($2^{nd}$) to the sixth ($6^{th}$) columns. According to Table 2, the content of this message body can include (i) an asset address (row 7, column 3), (ii) a civic location (row 7, column 4), (iii) a geodetic location (row 7, column 5) and/or (iv) an error or success code (row 7, column 6). According to the notes for Table 2, the asset address (i) is included if an asset address was present in the corresponding request (note 3); the civic location (ii) and geodetic location (iii) are each included if each is configured for the asset in the NEAD 430 (note 4); and an error code (iv) is included in case of an error (note 5).

In operation, the UE 210 may initiate an emergency session establishment request. The core network 230 that is serving UE 210 may be configured to support the establishment of an emergency call from the UE 210 to a legacy emergency services network (ESN) or a National Emergency Number Association (NENA) i3-capable emergency services network (ESN) and its PSAPs (e.g., 425a, 425b). Functions supported by the core network 230 may include emergency call detection, call routing and determination and provision to a PSAP (e.g. PSAP 425a or 425b) of a dispatchable location and/or a geodetic location. In an example, for a UE 210 with a valid subscription, the core network 230 may also support callback from a PSAP. The legacy ESN/PSAP 425a may be configured to receive emergency calls and associated dispatchable location information (and geodetic location information) from the serving core network 230 (e.g., from the gateway 420), such as defined in Telecommunications Industry Association (TIA) standard J-STD-036. The i3 ESInet/PSAP 425b may be configured to receive emergency calls and dispatchable location information (and geodetic location information) from the serving core network 230 (e.g., from the gateway 420) using next generation mechanisms (e.g., such as defined in the NENA i3 standard).

Figure 5:
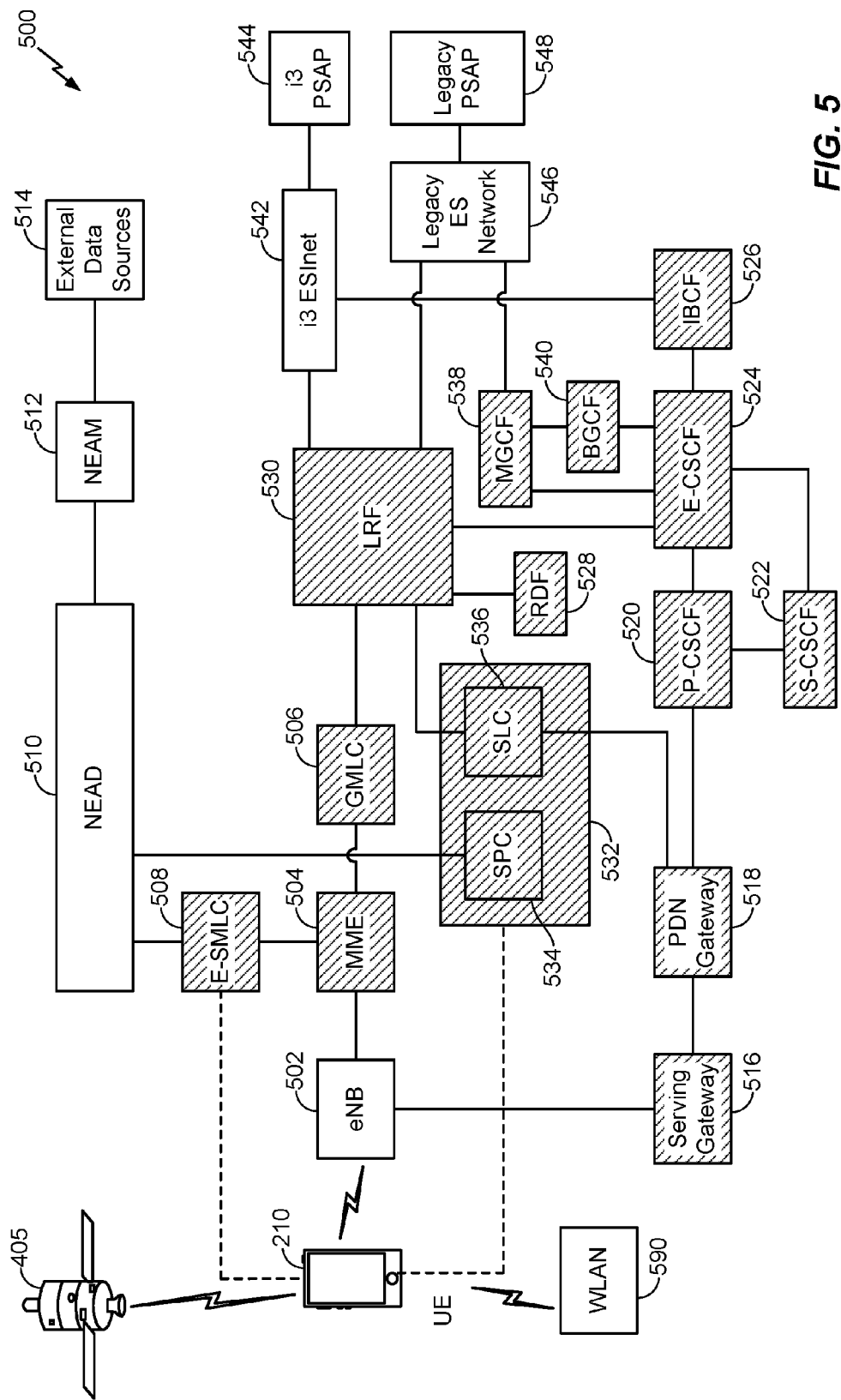
FIG. 5 illustrates an LTE implementation of the wireless communications system of FIG. 4 in accordance with an embodiment of the disclosure.

Referring to FIG. 5, an LTE architecture 500 for transferring asset-related information with 3GPP LTE access is shown. The LTE architecture 500 is an example containing additional details of the wireless communications system 400 in FIG. 4 and the communications system 200 in FIG. 2. In FIG. 5, a serving evolved Node B (eNB) 502 may correspond to all or part of access network 225 in FIGS. 2 and 4; E-SMLC 508 and/or E-SLP 532 may correspond to location server 415 in FIG. 4; LRF 530 may correspond to gateway 420 in FIG. 4; NEAD 510 may correspond to NEAD 430 in FIG. 4 and/or to database 243 in FIG. 2; NEAM 512 may correspond to NEAM 435 in FIG. 4 and/or to Information Manager 240 in FIG. 2; external data sources 514 may correspond to external data sources 245 in FIGS. 2 and 4; WLAN 590 may correspond to or contain asset 410 in FIG. 4; i3 PSAP 544 combined with i3 ESInet 542 may correspond to i3 ESInet/PSAP 425b in FIG. 4; Legacy PSAP 548 combined with Legacy ES Network 546 may correspond to Legacy ESN/PSAP 425a in FIG. 4; and entities shown with shading in FIG. 5 (e.g. MME 504 and PDN Gateway 518) may comprise all or part of Core Network 230 in FIGS. 2 and 4.

In the LTE architecture 500, UE 210 may communicate with the eNB 502 in a radio access network (RAN) to obtain communication services. The RAN may include other network entities not shown in FIG. 5 for simplicity and may also be referred to as an Evolved Universal Terrestrial Radio Access Network (E-UTRAN). The eNB 502 may also be referred to as a Node B, a base station, an access point, etc. The UE 210 may receive and measure signals from one or more SPS satellites 405 (e.g. may obtain GNSS pseudo-range measurements). The UE 210 may also or instead receive and measure LTE signals from eNBs (such as eNB 502) and thereby obtain LTE signal measurements and information that may include the identities of the eNBs, timing measurements (e.g., for signal time of arrival (TOA), signal observed time difference of arrival (OTDOA) or round trip signal propagation time (RTT)), signal strength measurements, and/or signal quality measurements for the eNBs. The GNSS pseudo-range measurements and/or LTE signal measurements and information may be used to derive a location estimate for UE 210 (e.g., by UE 210 or by a location server such as E-SMLC 508 or E-SLP 532 to which UE 210 may send these measurements and information). The UE 210 may also or instead receive and optionally measure signals from nearby APs in a WLAN 590 which may include obtaining identities (e.g., MAC addresses) for WiFi and/or BTLE APs in WLAN 590 whose signals can be received by UE 210 and possibly measuring characteristics of these received signals such as Received Signal Strength Indication (RSSI) or RTT. The WLAN AP 590 identities and measurements may also be used to obtain a location for UE 210, e.g., by UE 210 or by a location server such as E-SMLC 508 or E-SLP 532 to which UE 210 sends this information. The eNB 502 and/or WLAN AP 590 identities obtained by UE 210 may be used to query the NEAD 510 (e.g., by a location server such as E-SMLC 508 or E-SLP 532 which received these identities from UE 210) for a dispatchable civic location for UE 210 as previously described.

The NEAD 510 may have been previously configured by the NEAM 512 with the civic and/or geodetic locations for assets such as APs in WLAN 590. The NEAM 512 may have received the civic and/or geodetic locations for assets such as APs in WLAN 590 from external data sources 514. Transfer of management or ownership of some assets such as some or all APs in WLAN 590 may have previously occurred and may have been notified to NEAM 512 by one or more of external data sources 514 according to one or more embodiments of the method described herein. Notification to the NEAM 512 of the transfer of management or ownership of some assets, such as some or all APs in WLAN 590, may enable external data sources 514 to provide updated information to NEAM 512 for some assets, such as updated civic and/or updated geodetic locations for some APs in WLAN 590. This updated information may be configured by NEAM 512 in NEAD 510 and may be provided by NEAD 510 to a location server such as E-SMLC 508 or E-SLP 532 to help enable determination of a dispatchable civic location for the UE 210. Thus, embodiments of the method described herein may help enable determination of a dispatchable civic location for the UE 210.

The eNB 502 may communicate with a Mobility Management Entity (MME) 504, which may perform various control functions such as mobility management, Packet Data Network (PDN) gateway selection, authentication, bearer management, etc. MME 504 may communicate with an E-SMLC 508 and a GMLC 506. The E-SMLC 508 may support UE-based, UE-assisted, network-based and/or network-assisted positioning methods and may support one or more MMEs. The E-SMLC 508 may also be referred to as a location server (LS), a Stand Alone SMLC (SAS), etc. E-SMLC 508 may also communicate with the NEAD 510 to support location services. The GMLC 506 may perform various functions to support location services, interface with external clients (e.g., legacy ES network 546), and provide services such as subscriber privacy, authorization, authentication, billing, etc. The LRF 530 may communicate with GMLC 506 and may route or help route IP-based emergency calls to a PSAP, such as i3 PSAP 544 or legacy PSAP 548, or to an ESN such as the i3 ESInet 542 or legacy ES network 546. An E-SLP 532, including SUPL Positioning Center (SPC) 534 and a SUPL Location Center (SLC) 536, are also configured to obtain location information for the UE 210 using the SUPL location solution defined by OMA and to provide obtained location information to the LRF 530.

A Serving Gateway 516 may perform various functions related to IP data transfer for UEs such as data routing and forwarding, mobility anchoring, etc. A Packet Data Network (PDN) Gateway 518 may perform various functions such as maintenance of data connectivity for UEs, IP address allocation, IP anchoring, etc. An IP Multimedia Subsystem (IMS) may include various network entities to support IMS services such as Voice-over-IP (VoIP) calls and emergency VoIP calls. The IMS may include a Proxy Call Session Control Function (P-CSCF) 520, a Serving Call Session Control Function (S-CSCF) 522, an Emergency Call Session Control Function (E-CSCF) 524, a Breakout Gateway Control Function 540, a Media Gateway Control Function (MGCF) 538, an Interconnection Border Control Function (IBCF) 526, a Routing Determination Function (RDF) 528 and the LRF 530.

In operation, the LTE architecture 500 may utilize LTE interfaces and protocols for control plane location. The LPP protocol defined in 3GPP TS 36.355 combined with the OMA LPPe protocol may be used over the LTE Uu interface between the UE 210 and the eNB 502 for positioning of the UE 210 by the E-SMLC 508. LPP/LPPe messages may be transferred between the UE 210 and the E-SMLC 508 via the MME 504 and the eNB 502 for the UE 210 as described in 3GPP TSs 23.271 and 36.305. To support heightened accuracy location information (HALI), the E-SMLC 508 may be configured to request (e.g., by sending an LPP/LPPe Request Location Information message to UE 210), and the UE 210 may be configured to provide (e.g., by sending an LPP/LPPe Provide Location Information message to E-SMLC 508) the identities of visible WLAN APs, signal measurements of visible WLAN APs (e.g., RSSI, RTT), and an uncompensated barometric pressure (UBP) if supported by the UE 210.

In an alternative embodiment, either (i) the LPP protocol alone without LPPe or (ii) the RRC protocol defined in 3GPP 36.331 may be used over the Uu interface between the UE 210 and the serving eNB 502 for positioning of the UE 210 by the E-SMLC 508. In the case of LPP (alternative (i)), LPP messages may be transferred between the UE 210 and the E-SMLC 508 via the MME 504 and the serving eNB 502 for the UE 210 as described in 3GPP TSs 23.271 and 36.305. In the case of RRC (alternative (ii)), RRC messages may be transferred between the UE 210 and the serving eNB 502 and LTE Positioning Protocol A (LPPa) messages may be transferred between eNB 502 and E-SMLC 508 via the MME 504 for the UE 210 as described in 3GPP TSs 23.271 and 36.305. To support heightened accuracy location information (HALI), the E-SMLC 508 may be configured to request (e.g., by sending an LPP Request Location Information message to UE 210 or an LPPa request message to eNB 502 which may cause eNB 502 to send an RRC request message to UE 210), and the UE 210 may be configured to provide (e.g., by sending an LPP Provide Location Information message to E-SMLC 508 or an RRC response to eNB 502 which causes eNB 502 to send an LPPa response to E-SMLC 508) the identities of visible WLAN APs, signal measurements of visible WLAN APs (e.g., RSSI, RTT), and an uncompensated barometric pressure (UBP) if supported by the UE 210.

A location services application protocol (LCS-AP) defined in 3GPP TS 29.171 may be used over the SLs interface between the MME 504 and the E-SMLC 508 to enable the MME 504 to request location information for the UE 210 from the E-SMLC 508 using the 3GPP control plane solution. To support HALI exchanges, the LCS-AP protocol may enable the E-SMLC 508 to return the HALI to the MME 504. An Evolved Packet Core Location Services Protocol (ELP) defined in 3GPP TS 29.172 may be used over the SLg interface between the MME 504 and the GMLC 506 to enable the GMLC 506 to request and obtain location information for the UE 210 using the 3GPP control plane solution. To support HALI the ELP protocol may enable the MME 504 to return the HALI to the GMLC 506. An L0 interface may be used between the LRF 530 and the GMLC 506 to enable the LRF 530 to request location information for the UE 210 from the GMLC 506 in the case that the UE 210 is establishing or has established an IMS emergency call to a PSAP (e.g. i3 PSAP 544 or legacy PSAP 548). To support HALI, the L0 interface may enable the GMLC 506 to return HALI to the LRF 530. An Le E2 interface may be used between the LRF 530 and legacy ES network 546 to enable legacy ES network 546 to request location information for the UE 210 from the LRF 530 in the case that the UE 210 establishes an emergency call to the legacy PSAP 548. An Le i3 interface may be used between the LRF 530 and the i3 ESInet 542 to enable the i3 ESInet 542 to request location information for the UE 210 from the LRF 530 in the case that the UE establishes or has established an emergency call to the i3 PSAP 544.

The LTE architecture 500 may also utilize interfaces and protocols for SUPL User Plane Location. A Lup interface as defined in OMA publication OMA-AD-SUPL-V2_0 may be used between the UE 210 (also referred to as a SUPL Enabled Terminal (SET)) and the E-SLP 532 to support positioning of the UE 210 using the OMA SUPL user plane solution. In the case of location in association with an emergency call, the E-SLP 532 may be configured to be used in the serving core network for UE 210 which may correspond in whole or in part to the entities shown shaded in FIG. 5. The Lup interface may enable exchange of SUPL ULP messages, defined in OMA TS OMA-TS-ULP-V2_0_3, between the UE 210 and the E-SLP 532. The E-SLP 532 may be split into the SLC 536 and the SPC 534. The SLC 536 may be configured to establish and control a SUPL session with the UE 210. The SPC 534 may be configured to obtain a location of the UE 210. The endpoint for any ULP message is then either the SLC 536 or the SPC 534 depending on whether the ULP message is used for control and service provision or for positioning. In the case of the UE 210 (e.g., with LTE access), the ULP messages used for positioning may typically encapsulate one or more LPP messages. Each encapsulated LPP message may further encapsulate one LPPe message. To support heightened accuracy location, either LPP or both LPP and LPPe (referred as LPP/LPPe) may be used to enable the SPC 534 to request, and the UE 210 to return the same information as described for control plane location described above.

An ILP protocol defined in OMA TS OMA-TS-ILP-V2_0_3 may be used over an L1p interface between the SLC 536 and SPC 534 to enable the SLC 536 to instigate positioning of the UE 210 using the SPC 534 and to obtain location information for the UE 210 from the SPC 534. An L0 interface may be used between the LRF 530 and the E-SLP 532 to enable the LRF 530 to request location information for the UE 210 from the E-SLP 532 in the case that the UE 210 establishes or has established an IMS emergency call to a PSAP (e.g. i3 PSAP 544 or legacy PSAP 548). The Le E2 and Le i3 interfaces in the user plane may be the same as those described for control plane location above.

Figure 6:
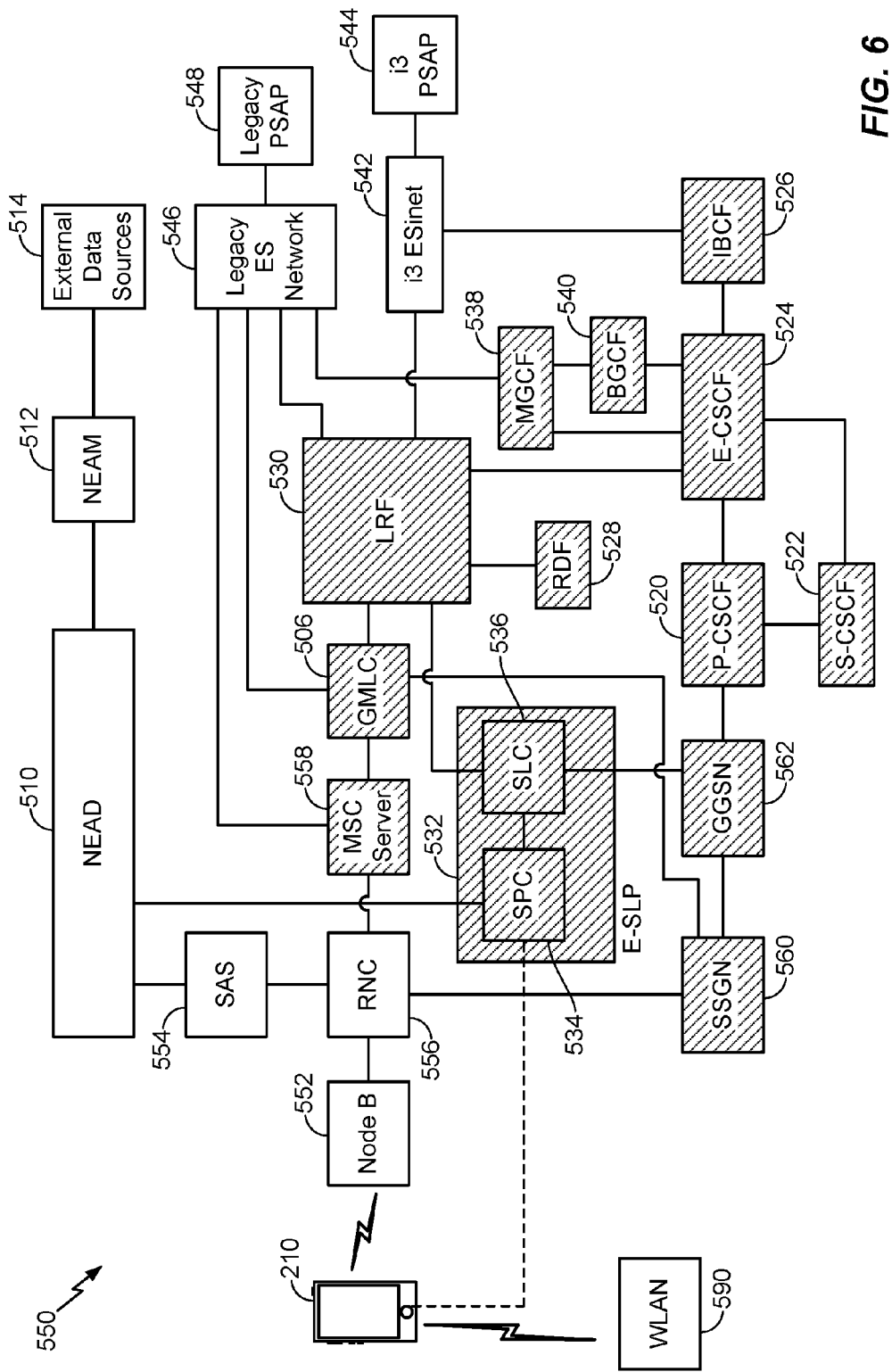
FIG. 6 illustrates a UMTS implementation of the wireless communications system of FIG. 4 in accordance with an embodiment of the disclosure.

Referring to FIG. 6, a UMTS architecture 550 for transferring asset related information with Universal Mobile Telecommunications System (UMTS) access is shown. In FIG. 6, Node B 552 combined with Radio Network Controller (RNC) 556 may correspond to all or part of access network 225 in FIGS. 2 and 4; SAS 554 and/or E-SLP 532 may correspond to location server 415 in FIG. 4; LRF 530 and/or GMLC 506 may correspond to gateway 420 in FIG. 4; NEAD 510 may correspond to NEAD 430 in FIG. 4 and/or to database 243 in FIG. 2; NEAM 512 may correspond to NEAM 435 in FIG. 4 and/or to Information Manager 240 in FIG. 2; external data sources 514 may correspond to external data sources 245 in FIGS. 2 and 4; WLAN 590 may correspond to or contain asset 410 in FIG. 4; i3 PSAP 544 combined with i3 ESInet 542 may correspond to i3 ESInet/PSAP 425*b* in FIG. 4; Legacy PSAP 548 combined with Legacy ES Network 546 may correspond to Legacy ESN/PSAP 425*a* in FIG. 4; and entities shown with shading in FIG. 6 (e.g. SGSN 560 and GGSN 562) may comprise all or part of Core Network 230 in FIGS. 2 and 4.

The UMTS architecture 550 includes a radio access network (RAN) with a Node B 552, an RNC 556, and an SAS 554. The UMTS architecture 550 also includes a core network containing the entities shown shaded in FIG. 6 that include a mobile switching center (MSC) server 558, a GMLC 506, a serving General Packet Radio Service (GPRS) support node (SGSN) 560, a gateway GPRS support node (GGSN) 562, in addition to elements as depicted in FIG. 5 and previously described.

An RRC protocol defined in 3GPP TS 25.331 may be used over a Uu interface for positioning of the UE 210 by the RNC 556 in the case of control plane location with circuit-switched (CS) access. To support heightened accuracy location, the RNC 556 may be configured to request, and the UE 210 may be configured to provide the identities of visible WLAN APs (e.g., APs in WLAN 590), and an uncompensated barometric pressure (UBP), if supported by the UE 210. A PCAP protocol as defined in 3GPP TS 25.453 may be used over an Iupc interface between the RNC 556 for the UE 210 and the SAS 554 to enable the RNC 556 to request location information for the UE 210 from the SAS 554 using the 3GPP control plane solution. The RNC 556 and the SAS 554 may interact using PCAP in either a SAS centric mode where the SAS 554 controls the use of different position methods and all interaction with the UE 210, or in RNC centric mode where the RNC 556 controls the use of different position methods and all interaction with the UE 210 and invokes the SAS 554 only to provide assistance data for the UE 210 or to compute a location from location related measurements provided by the UE 210 to the RNC 556. The Radio Access Network Application Part (RANAP) protocol defined in 3GPP TS 25.413 may be used over an Iupc interface between the MSC server 558 for the UE 210 and the RNC 556 to enable the MSC server 558 to request location information for the UE 210 from the RNC 556 using the 3GPP control plane solution. The Mobile Application Part (MAP) protocol as defined in 3GPP TS 29.002 may be used over an Lg interface between MSC server 558 for the UE 210 and the GMLC 506 to enable the GMLC 506 to request and obtain location information for the UE 210 using the 3GPP control plane solution. An Le E2 interface may be used between the GMLC 506 and the legacy ES network 546 to enable the legacy ES network 546 to request location information for the UE 210 from the GMLC 506 in the case that the UE 210 has established an emergency call to the legacy PSAP 548 using the circuit-switched (CS) domain. The Le E2 interface may be defined in TIA standard J-STD-036C and in NENA standard NENA-05-001.

The UMTS architecture 550 also supports interfaces and protocols to support heightened accuracy location in the case of packet-switched (PS) access and control plane location. The RRC protocol as defined in 3GPP TS 25.331 may be used over the Uu interface for positioning of the UE 210 by the RNC 556 in the case of control plane location with PS access. The PCAP protocol as defined in 3GPP TS 25.453 may be used over the Iupc interface between the RNC 556 for the UE 210 and the SAS 554 to enable the RNC 556 to request location information for the UE 210 from the SAS 554 using the 3GPP control plane solution. The RANAP protocol defined in 3GPP TS 25.413 may be used over the Iupc interface between the SGSN 560 for the UE 210 and the RNC 556 to enable the SGSN 560 to request location information for the UE 210 from the RNC 556 using the 3GPP control plane solution. The MAP protocol defined in 3GPP TS 29.002 may be used over an Lg interface between the SGSN 560 for the UE 210 and the GMLC 506 to enable the GMLC 506 to request and obtain location information for the UE 210 using the 3GPP control plane solution. The ELP protocol defined in 3GPP TS 29.172 may be used over an Lgd interface between the SGSN 560 for the UE 210 and the GMLC 506 to enable the GMLC 506 to request and obtain location information for the UE 210 using the 3GPP control plane solution. The Lgd interface may be applicable to an SGSN 560 that supports 3GPP Evolved Packet System (EPS) based interfaces and protocols. An L0 interface may be used between the LRF 530 and the GMLC 506 to enable the LRF 530 to request location information for the UE 210 from the GMLC 506 in the case that the UE 210 is establishing or has established an emergency call to a PSAP (e.g. i3 PSAP 544 or Legacy PSAP 548) using PS access. An Le E2 interface may be used between the LRF 530 and the legacy ES network 546 to enable the legacy ES network 546 to request location information for the UE 210 from the LRF 530 in the case that the UE 210 has established an emergency call to a legacy PSAP (e.g. Legacy PSAP 548) using PS access. An Le i3 interface may be used between the LRF 530 and i3 ESInet 542 to enable an entity in or connected to i3 ESInet 542 (e.g., i3 PSAP 544) to request location information for the UE 210 from LRF 530 in the case that the UE 210 is establishing or has established an emergency call to an i3 PSAP (e.g. i3 PSAP 544) using PS access.

The UMTS architecture 550 also supports interfaces and protocols to support heightened accuracy location in the case of user plane location. A Lup interface as defined in OMA publication OMA-AD-SUPL-V2_0 may be used between the UE 210 (also referred to as a SET) and the E-SLP 532 to support positioning of the UE 210 using the OMA SUPL user plane solution. In the case of location in association with an emergency call, the E-SLP 532 may be configured to be used in the serving core network for UE 210 which may correspond in whole or in part to the entities shown shaded in FIG. 6. The Lup interface may enable exchange of SUPL ULP messages, defined in OMA TS OMA-TS-ULP-V2_0_3, between the UE 210 and the E-SLP 532. The E-SLP 532 may be split into the SLC 536 and the SPC 534. The SLC 536 may be configured to establish and control a SUPL session with the UE 210. The SPC 534 may be configured to obtain a location of the UE 210. The endpoint for any ULP message is then either the SLC 536 or the SPC 534 depending on whether the ULP message is used for control and service provision or for positioning. In the case of the UE 210 (e.g., with UMTS access), the ULP messages used for positioning may typically encapsulate one or more LPP or Radio Resource Control (RRC) messages. In case of LPP, each encapsulated LPP message may further encapsulate one LPPe message. To support heightened accuracy location, RRC, LPP or LPP/LPPe may be used to enable the SPC 534 to request, and the UE 210 to return the same information as described for UMTS control plane location for FIG. 6 described above.

An ILP protocol defined in OMA TS OMA-TS-ILP-V2_0_3 may be used over an L1p interface between the SLC 536 and SPC 534 to enable the SLC 536 to instigate positioning of the UE 210 using the SPC 534 and to obtain location information for the UE 210 from the SPC 534. An L0 interface may be used between the LRF 530 and the E-SLP 532 to enable the LRF 530 to request location information for the UE 210 from the E-SLP 532 in the case that the UE 210 establishes or has established an IMS emergency call to a PSAP (e.g. i3 PSAP 544 or legacy PSAP 548). The Le E2 and Le i3 interfaces in the user plane may be the same as those described for control plane location for UMTS architecture 550 in FIG. 6 above.

As for the LTE architecture 500, the NEAD 510 in the UMTS architecture 550 may have been previously configured by the NEAM 512 with the civic and/or geodetic locations for assets such as APs in WLAN 590. The NEAM 512 may have received the civic and/or geodetic locations for assets such as APs in WLAN 590 from external data sources 514. Transfer of management or ownership of some assets such as some or all APs in WLAN 590 may have previously occurred and may have been notified to NEAM 512 by one or more of external data sources 514 according to one or more embodiments of the method described herein. Notification to the NEAM 512 of the transfer of management or ownership of some assets, such as some or all APs in WLAN 590, may enable external data sources 514 to provide updated information to NEAM 512 for some assets, such as updated civic and/or updated geodetic locations for some APs in WLAN 590. This updated information may be configured by NEAM 512 in NEAD 510 and may be provided by NEAD 510 to a location server such as SAS 554 or E-SLP 532 to help enable determination of a dispatchable civic location for the UE 210. Thus, embodiments of the method described herein may help enable determination of a dispatchable civic location for the UE 210 for UMTS architecture 550.

Figure 7:
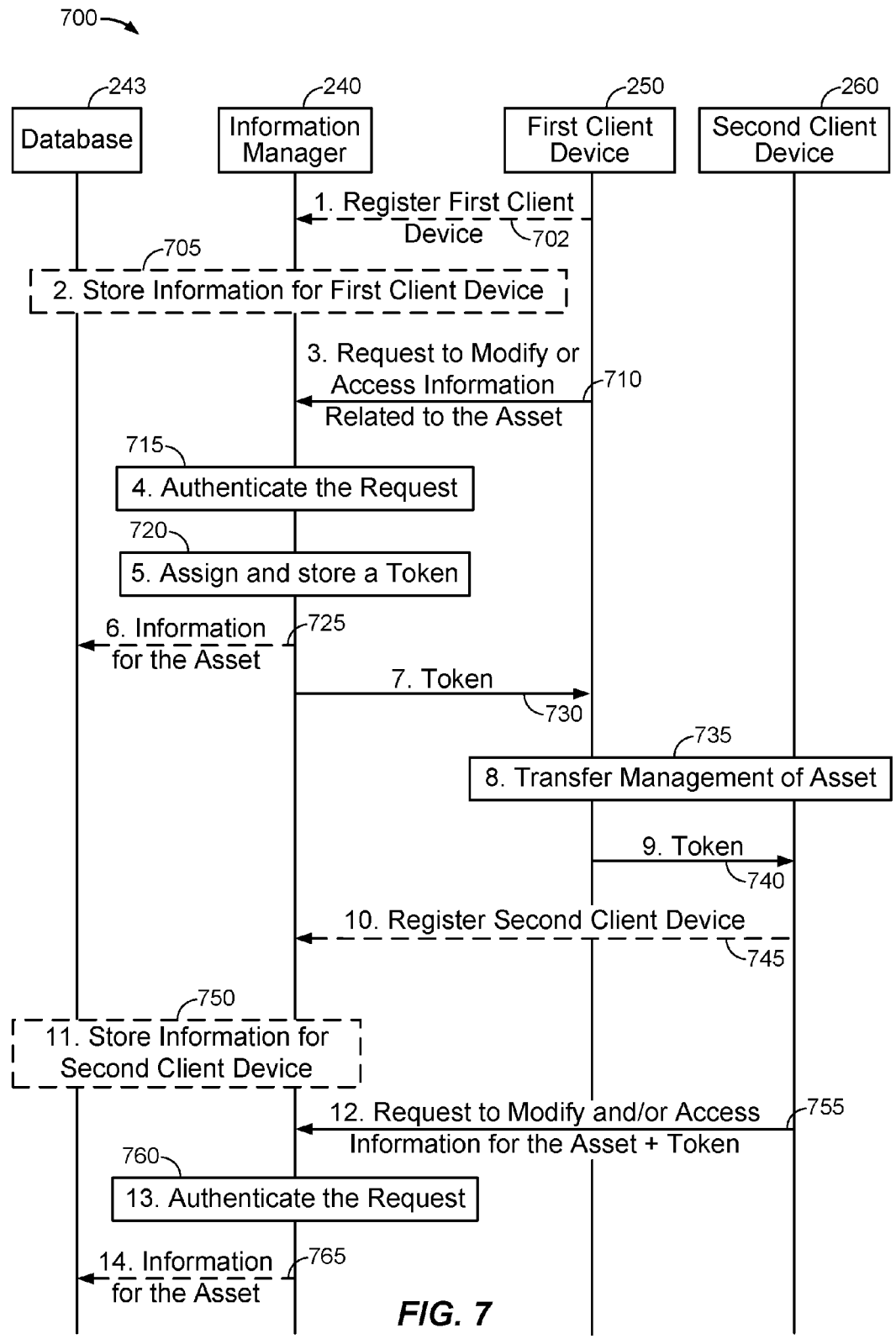
FIG. 7 illustrates a process by which an Information Manager authenticates a request to access or modify information related to an asset in association with a transfer of management or ownership in accordance with an embodiment of the disclosure.

FIG. 7 illustrates a process 700 by which the Information Manager 240 authenticates a request to access or modify information related to an asset in association with a transfer of management in accordance with an embodiment of the disclosure. For convenience, the process 700 of FIG. 7 is described with respect to certain components from FIG. 2, particularly the Information Manager 240 (e.g., which may correspond to the NEAM 435 or NEAM 512), the database 243 (e.g., which may correspond to the NEAD 430 or NEAD 510), and the first and second client devices 250 and 260 which are respectively operated by different entities. While the process 700 refers to a transfer of management of an asset, the transfer of management may, in some embodiments, correspond also or instead to a transfer of ownership of the asset.

Referring to FIG. 7, the first client device 250 optionally registers itself (or the associated first entity 255) at 702 as an owner and/or manager of one or more assets (e.g., WiFi APs, a BTLE beacons, small-cell APs such as pico-cells, femto-cells or home base stations, etc.) with the Information Manager 240. Registration may also be referred to as identification. As part of registration (or identification) at 702, first client device 250 may provide information to Information Manager 240 such as the name, postal address, Email address, type of business for first client device 250 and/or for associated first entity 255 and may be provided with or otherwise obtain security related information to enable secure access to Information Manager 240 on later occasions (e.g., such as at 710). The security related information may comprise a logon and password in the case of website access to Information Manager 240 or an identity (e.g. a name) and a ciphering and/or authentication key in the case of automated machine-to-machine access to Information Manager 240. Following 702, at 705, Information Manager 240 optionally coordinates with the database 243 in order to store information for the first client device 250 and/or for the associated first entity 255. In an example, during the registration (or identification) procedure of 702-705, the first client device 250 may indicate whether transfer of asset management for assets to another entity is pre-authorized. Alternatively, pre-authorization for asset management transfer can occur post-registration, during the request of 710 for instance (discussed below in more detail). In some embodiments, there may be no explicit pre-authorization for transfer of management of an asset at either 702 or 710 but instead there may be a default understanding or convention whereby transfer of management of any asset such as the asset Z referred to below is authorized or otherwise permitted. If asset management transfer is pre-authorized, a token may be used to facilitate an asset management transfer, as discussed below in more detail. While not expressly illustrated in FIG. 7, in the case where asset management transfer is not pre-authorized (e.g., at 702 or at 710), the token is not generated and is not used to facilitate an eventual asset management transfer.

Referring to FIG. 7, the first client device 250 transmits a request at 710 to add, modify and/or access information related to an asset Z (e.g., which may correspond to asset 410 in FIG. 4 and/or may be a WiFi access point, Bluetooth beacon or small cell base station). The request of 710 is accompanied at least by an asset identifier for asset Z, such as a wireless MAC address of the asset Z (e.g., if the asset corresponds to a WiFi or BTLE AP). In an example, the request of 710 can request that existing information that is stored for the asset Z in the Information Manager 240 and/or in the database 243 be changed, retrieved or deleted, or alternatively that new information be added into the record for the asset Z (or that a new record be created for the asset Z if there is no existing record for the asset Z). For example, the request of 710 can request (i) addition, retrieval, deletion and/or modification to a civic location of the asset Z; (ii) addition, retrieval, deletion and/or modification to a geodetic or geographic location of the asset Z; (iii) addition, retrieval, deletion and/or modification to information for a managing entity of the asset (e.g., for the first entity 255); (iv) an authorization to transfer management of the asset Z to a new entity; or (v) some combination thereof. In the case of an information retrieval request, the information related to the asset Z that is requested for retrieval may be requested for a managing entity of the asset (e.g., in 710 of FIG. 7, the first entity 255 in FIG. 2 associated with first client device 250). In an example, the first client device 250 may be prompted or triggered to transmit the request 710 either manually (e.g., an operator of the first client device 250 desires to add, change or retrieve particular information for the asset Z), in an event-triggered manner (e.g., each time asset information is detected as changing such as if asset Z is moved to a new location) or on a periodic basis. For example, consider an example where the asset Z is a WiFi AP, and the first entity 255 associated with the first client device 250 moves the WiFi AP from a first building to a second building. In this case, the request of 710 may request that a location field of a record corresponding to the asset Z in the database 243 be updated to reflect the new location of the WiFi AP. As noted above, the request of 710 can also be used to indicate pre-authorization of asset management transfers.

Still referring to 710 of FIG. 7, the request of 710 can be configured to request information update and/or retrieval for an individual asset such as the asset Z, or alternatively information update and/or retrieval for a plurality of assets (e.g., which may include the asset Z). For example, if the first client device 250 interfaces with the Information Manager 240 in accordance with the message body for component B described above with respect to Table 1, information retrieval requests and/or information modification requests for multiple assets (e.g., including asset Z) can be aggregated and sent to the Information Manager 240 at 710 in the same message body. In an alternative example, an individual user or small business may issue information retrieval requests and/or information change requests for assets individually via the website interface for component A described in Table 1. In some embodiments, the request of 710 may be combined with the registration 702 or may follow the registration 702 (e.g., as part of the same session with a website for the Information Manager 240 or as part of the same communication session employing a communications protocol with the Information Manager 240). The Information Manager 240 authenticates the request of 710 at 715. The authentication may make use of security related information provided to the first client device 250 at 702 (e.g., may make use of a logon and password or an identity and authentication and/or ciphering key). The Information Manager 240 then assigns and stores a token T1 for the asset Z at 720 by which subsequent requests from other clients to modify and/or access information related to the asset Z can be validated or authenticated. The token T1 may be stored in the Information Manager 240 and/or in the database 243. The first client device 250 may not need to provide or otherwise refer to the token T1 when first client device 250 sends further requests to Information Manager 240 to access or modify the information for the asset Z (e.g., in repetitions of step 710) since the token T1 may only be used following a transfer of management of the asset Z to a new entity. In an example, the token T1 can correspond to a number, a name or a character string, or alternatively to any other type of label or authentication credential. In an embodiment, the token T1 may correspond to an authentication key and may be used to authenticate a new manager of the asset Z using an authentication procedure (e.g., the HTTP digest procedure). In an example, the token T1 may be uniquely assigned by the Information Manager 240 to the asset Z, such that no other asset being tracked by the Information Manager 240 is assigned the same token. If the request of 710 requests modification to the information related to the asset Z and the request is authenticated at 715, then the Information Manager 240 optionally coordinates with the database 243 to update the information related to the asset Z at 725. Alternatively, if the request of 710 is an information retrieval request that does not strictly require any modifications to the existing information for the asset Z in the database 243, then the information update of 725 need not be performed. The Information Manager 240 also sends the token T1 to the first client device 250 at 730.

Referring to FIG. 7, at some later time, assume that management of the asset Z transfers from first entity 255 to second entity 265 at 735. An asset management transfer can occur in a number of different ways. For example, the second entity 265 may purchase or merge with the first entity 255, such that all assets previously managed by first entity 255 are merged with the assets being managed by second entity 265. Alternatively, an owner of the asset Z may have a business relationship with the first entity 255 to manage certain assets of the owner including the asset Z and may transfer the management of some or all of these assets including the asset Z to second entity 265. In some embodiments, the transfer of management of the asset Z from first entity 255 to second entity 265 may correspond to the second entity 265 managing the asset Z with the first entity 255 no longer managing the asset Z. In some other embodiments, the transfer of management of the asset Z from the first entity 255 to second entity 265 may correspond to the second entity 265 managing the asset Z in addition to the first entity 255 continuing to manage the asset Z. To facilitate the transfer of asset Z management at 735, the first client device 250 of the first entity 255 transmits the token T1 acquired at 730 (and may also transfer the identity of the asset Z) to the second client device 260 of the second entity 265 at 740. As will be appreciated, if the first client device 250 is itself being re-associated with the second entity 265 (e.g., in an entity merger scenario), the transfer of the token T1 at 740 can be optional, as it is possible that the first client device 250 itself can thereafter operate as a client device of the second entity 265 for the purpose of managing the asset Z. It will also be appreciated that the transfer of the token T1 from the first entity 255 to the second entity 265 at 740 may be facilitated by other devices belonging to each entity in addition to client devices 250 and 260. Thus, while the token T1 may be transferred from the first client device 250 to the second client device 260 at 740, the transfer may not be direct and may involve transferring the token T1 through one or more intermediate devices belonging to the first entity 255, the second entity 265 and/or other entities.

At 745, the second client device 260 optionally registers (or identifies) itself (or the associated second entity 265) as an owner and/or manager of assets with the Information Manager 240, and the Information Manager 240 optionally coordinates with the database 243 in order to store information for the second client device 260 and/or the second entity 265 at 750. The registration (or identification) of the second client device 260 at 745 and the information storage at 750 may be similar to or the same as that described for the first client device 250 at 702 and 705, respectively. Moreover, the registration at 745 may occur before, after or at the same time as the registration of the first client device 250 at 702. In an example, during the registration procedure of 745-750, the second client device 260 may indicate whether transfer of asset management to another entity from second entity 265 is pre-authorized. Alternatively, pre-authorization for asset management transfers can occur post-registration, during the request of 755 for instance (discussed below in more detail). If asset management transfers for assets are pre-authorized, a token may be used to facilitate an asset management transfer (e.g., similar to the process of 735-740). While not expressly illustrated in FIG. 7, in the case where asset management transfer is not pre-authorized, a token would not be used in the event of an eventual asset management transfer from second entity 265 to another entity. Expanding on this scenario, in the case where asset management transfer is not pre-authorized, the token T1 received from 740 could be revoked after its initial use at 755 without obtaining a new token (e.g. different to token T1) for transferring management of the asset Z to another entity from second entity 265.

Referring to FIG. 7, the second client device 260 transmits a request to modify and/or access information related to the asset Z at 755. The request of 755 is accompanied at least by an asset identifier, such as a MAC address of the asset Z in the case of an asset Z corresponding to a WiFi or BTLE AP, and by a token T1* that corresponds to (e.g. equals) the token T1 that is transferred from the first client device 250 to the second client device 260 at 740. In some embodiments, the request to modify and/or access information related to the asset Z may only provide an identification for the asset Z (e.g., a MAC address) and the token T1* may only be provided by second client device 260 after Information Manager 240 has prompted or requested second client device 260 to provide the token (not shown in FIG. 7). In an example, the request of 755 can request that existing information that is stored for the asset Z in the Information Manager 240 and/or the database 243 be changed, retrieved or deleted, or alternatively that new information be added into the record for the asset Z. For example, the request of 755 can request (i) addition, retrieval, deletion and/or modification to a civic location of the asset Z; (ii) addition, retrieval, deletion and/or modification to a geodetic or geographic location of the asset Z; (iii) addition, retrieval, deletion and/or modification to information for a previous or current managing entity of the asset (e.g., for the first client device 250, the first entity 255, the second client device 260 and/or the second entity 265); (iv) addition, retrieval, deletion and/or modification to information for a previous or current owning entity of the asset (e.g. for the first entity 255 and/or second entity 265); (v) update of information to indicate a transfer of management of the asset Z (e.g., from first entity 255 to second entity 265); (vi) an authorization to transfer management of the asset Z to a further new entity; or (vii) some combination thereof. In a particular example, the request of 755 can indicate that management of the asset Z was transferred by first entity 255 to second entity 265 and that first entity 255 no longer manages asset Z or can indicate that management of asset Z was transferred by first entity 255 to second entity 265 and that first entity 255 still manages asset Z in addition to second entity 265.

The Information Manager 240 authenticates the request of 755 at 760 based at least in part on the token T1*. For example, the Information Manager 240 can compare the token T1 stored at the Information Manager 240 at 720 for the asset Z to the token T1* that is received with the request of 755, and the Information Manager 240 authenticates the request of 755 if the comparison indicates a match (e.g. indicates that T1* is identical to T1). The Information Manager 240 may also authenticate the request at 755 using security related information previously provided to the second client device 260 at 745. For example, the Information Manager 240 may provide a logon identity and password (or an identity and an authentication and/or ciphering key) to the second client device 260 during the registration at 745 which the second device 260 may provide back to the Information Manager 240 as part of the request at 755; the logon identity and password (or the identity and authentication and/or ciphering key) can then be authenticated by the Information Manager at 760. The authentication at 760 using security related information previously provided to the second client device 260 at 745 may precede the authentication using the token T1 assigned to asset Z. Following a successful authentication at 760, the Information Manager 240 may assign and store a new unique token T2 (different to token T1) for the asset Z that replaces or supplements the token T1 assigned at 720 and may return the new token T2 to the second client device 260 (not shown in FIG. 7). For example, a new token T2 may be assigned and returned if the request at 755 (or a request from second client device 260 to Information Manager 240 subsequent to 755 and not shown in FIG. 7) requests pre-authorization for transfer of management of the asset Z from second entity 265 to some third entity at a later time. In an alternative embodiment, following 760, Information Manager 240 or second client device 260 may revoke the token T1* (normally identical to token T1) transferred at 755 without a new token T2 being assigned and transferred to second client device 260 following 760—e.g., if the second entity 265 is not pre-authorized by Information Manager 240 to transfer management of the asset Z to a third entity. In another embodiment, the token T1 originally assigned at 720 may be retained by second entity 265 and transferred at a later time to a third entity if the second entity 265 transfers management of the asset Z to the third entity. In some embodiments, if first entity 255 continues to manage asset Z, in addition to second entity 265, after the transfer of management at 735, the token T1 may continue to be used by first entity 255 to transfer management of asset Z to other entities such as third entity 275 in a similar manner to that described above for transfer of management to second entity 265.

While not shown explicitly in FIG. 7, the Information Manager 240 may send an alert to the first client device 250 (or the first entity 255) in response to the authentication of 760. This may enable the first client device 250 or first entity 255 to indicate to the Information Manager 240 (e.g., via Email or telephone or using a communications protocol and not shown in FIG. 7) whether transfer of management (or ownership) of the asset Z is valid or invalid. At 765, the Information Manager 240 optionally changes the information related to the asset Z in the database 243. For example, the Information Manager 240 may record a transfer of management for the asset Z from the first entity 255 to the second entity 265. As will be appreciated, the information change of 765 is optional because the request of 755 may be an information retrieval request that does not strictly require any modifications to the existing asset information in the database 243.

In one alternative embodiment of the process 700, a plurality P of assets may replace the single asset Z referred to in the description above of the process 700. All steps 702-765 of the process 700 may remain as described above except that: (i) the request at 710 from first client device 250 and/or the request at 755 from second client device 260 may be to modify or access information related to one or more assets in the plurality P; (ii) the token T1 may be assigned and stored by Information Manager 240 at 720 related to the plurality P of assets; (iii) information may be updated and stored in database 243 at 725 and/or at 765 for one or more assets in the plurality P; and (iv) management of the plurality P of assets may be transferred by first entity 255 to second entity 265 at 735. In this alternative embodiment, the token T1 assigned and stored by the Information Manager 240 at 720, returned to the first client device 250 at 730, transferred to the second client device 260 at 740 and provided (in the form of the token T1*) to the Information Manager 240 by the second client device 260 at 755 may be associated with all assets in the plurality P. This may enable a bulk transfer of management of all assets in the plurality P from first entity 255 to the second entity 265 at 735 without the need to obtain and transfer a separate token for each asset in the plurality P. This may improve the efficiency of transfer of asset management by reducing the number of tokens that need to be assigned, stored and authenticated by the Information Manager 240 and received, stored and transferred or provided by the first and second client devices 250 and 260. This improved efficiency may reduce resource usage and avoid errors (e.g., when a particular token is lost or corrupted by the client device 250 or 260).

In another alternative embodiment of the process 700, the transfer of management of the asset Z at 735 may represent a permission from the first entity 255 to the second entity 265 for the second entity 265 (e.g., via the second client device 260) to access and/or modify information for the asset Z at 755, but may not represent a permanent transfer of management for the asset Z. This may be convenient for the first entity 255 and/or the second entity 265. For example, the second entity 265 may be in possession of new information for the asset Z which needs to be provided to the Information Manager 240. Rather than have the second entity 265 provide the new information to the first entity 255 and have the first entity (e.g., via the first client device 250) then update the information in the Information Manager 240 (which may cause delay and/or loss or error in the information), it may be simpler for the first entity 255 to provide the second entity 265 with the token (e.g. as at 740) and for the second entity 265 to update the Information manager 240 (e.g., via the second client device 260).

In a further embodiment of the process 700, the first client device 250 may transmit both the token T1 acquired at 730 to the second client device 260 at 740 and authentication data AD. The authentication data AD may be a digital signature or other form of authentication that enables another entity (e.g. Information Manager 240) to confirm that the token T1 was transmitted to the second client device 260 by the first client device 250 and was not obtained by the second client device 260 by other means (e.g. such as by intercepting the communication from Information Manager 240 to first client device 250 at 730 or by hacking into and reading data stored on first client device 250). The authentication data AD may for example comprise a digital signature for the token T1 obtained by first client device 250 using a private key for a public key-private key pair belonging to first client device 250 where the public key is known by Information Manager 240. Alternatively, the authentication data AD may be obtained by first client device 250 using a shared secret key known to both first client device 250 and Information Manager 240 (e.g. as obtained by first client device 250 as part of registration at 702). In other implementations, the authentication data AD may include a digital signature for the token T1 whose authenticity is shown by including one or more chained public key certificates (e.g. ITU X.509 public key certificates) in the authentication data AD that includes a certificate (e.g. root certificate) that can be verified by Information Manager 240 using a known public key. These forms of authenticating data (in this case the token T1) are well known in the art. In this embodiment, the request of 755 is accompanied by the authentication data AD in addition to the asset identifier and token T1* (corresponding to the token T1). The Information Manager 240 then authenticates the request of 755 at 760 based at least in part on both the token T1* and the authentication data AD. For example, the Information Manager 240 may verify the token T1* is the same as (e.g. equals) the token T1 stored at the Information Manager 240 at 720 for the asset Z. The Information Manager 240 may also verify that the authentication data AD was provided by the first client device 250—e.g. by using a known public key for the first client device 250 or a shared secret key for the Information Manager 240 and first client device 250 to verify that the authentication data AD was generated by the first client device 250 for the token T1. The authentication data AD can provide added assurance to the Information Manager 240 that the token T1 was transferred to the second client device 260 by the first client device 250 and was not obtained by the second client device 260 by other (e.g. unauthorized or illicit) means.

In another embodiment of the process 700, the authentication data AD described previously may be combined with the token T1. In this embodiment, the first client device 250 may cipher the token T1 received at 730 using a private key of a public key-private key pair, where the public key may be known to the Information Manager 240 or may be provided to the Information Manager 240 with one more public key certificates (e.g. that may form part of the authentication data AD). Alternatively, the first client device 250 may cipher the token T1 received at 730 using a shared secret key that is known to both the Information Manager 240 and the first client device 250. The first client device 250 may then transmit the ciphered token T1, instead of the unciphered token T1, to the second client device 260 at 740 and may also transmit the authentication data AD (e.g. that may include a public key and/or a public key certificate for the first client device 250). The second client device 260 may then accompany the request at 755 that is transmitted to the Information Manager 240 with a token T1* that corresponds to (e.g. equals) the ciphered token T1 received at 740 and may also accompany the request at 755 with the authentication data AD if received at 740. At 760, the Information Manager 240 may decipher the token T1* received at 755—e.g. using a shared secret key known to the Information Manager 240 and the first client device 250 or using a public key for the first client device 250 which may be known to the Information Manager 240 or provided and/or certified by authentication data AD received at 755. The Information Manager 740 may then compare the deciphered value of the token T1* with the value of the token T1 assigned and stored at 720 and may consider the request at 755 to be authenticated if the two values match (e.g. are equal).

The use of authentication data AD and/or ciphering of the token T1 in the embodiments of the process 700 described previously may enable improved authentication at 760 of the request transmitted at 755 by not only providing the Information Manager 240 with the token T1 assigned and stored at 720 but also showing that the token T1 must have been obtained by the second client device 260 from the first client device 250 by means authorized by the first client device 250 and not by means unauthorized by the first client device 250.

Figure 8:
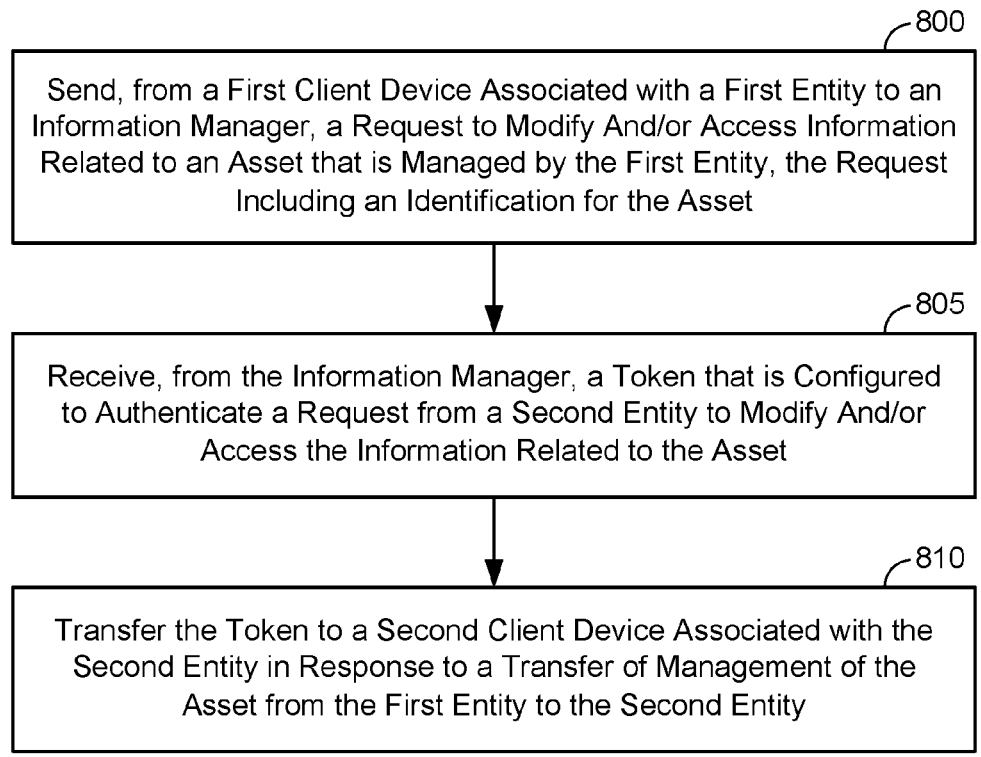
FIGS. 8-10 each illustrate an example implementation of a portion of the process of FIG. 7 in accordance with an embodiment of the disclosure.
Figure 9:
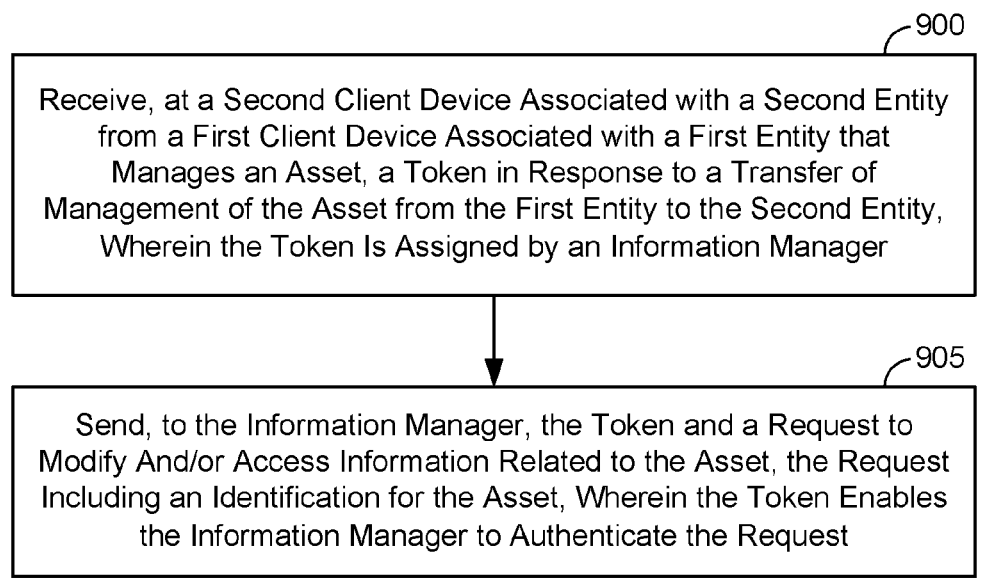
Figure 10:
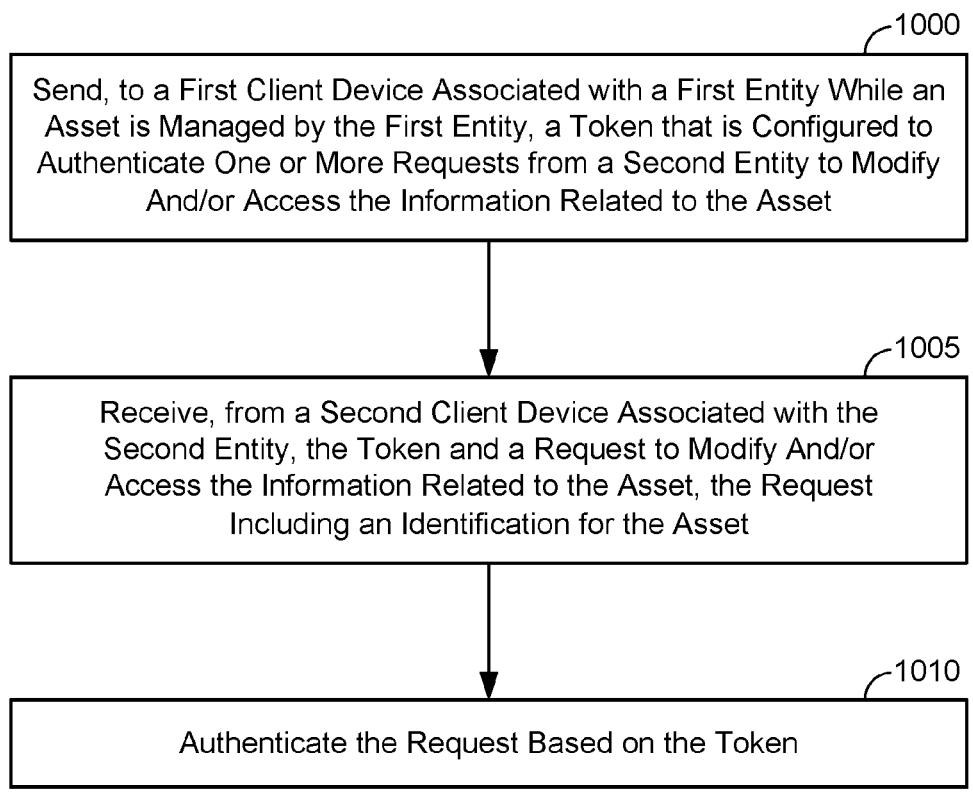

FIGS. 8-10 each illustrate an example implementation of a portion of the process 700 of FIG. 7 in accordance with an embodiment of the disclosure. More specifically, FIG. 8 depicts operation of the first client device 250, FIG. 9 depicts operation of the second client device 260 and FIG. 10 depicts operation of the Information Manager 240.

Referring to FIG. 8, similar to 710 of FIG. 7, at 800, a first client device (e.g., client device 250) associated with a first entity (e.g., entity 255) sends, to an Information Manager (e.g. the Information Manager 240), a request to modify and/or access information related to an asset (e.g., the asset Z for the process 700) that is managed by the first entity, the request including an identification for the asset. At 805, similar to 730 of process 700, the first client device (e.g., first client device 250) receives, from the Information Manager, a token (e.g. the token T1 for the process 700) that is configured to authenticate a request from a second entity (e.g., entity 265) to modify and/or access the information related to the asset. At 810, similar to 740 of process 700, the first client device (e.g., client device 250) transfers the token to a second client device (e.g., client device 260) associated with a second entity (e.g., entity 265) in response to a transfer of (or change in) management of the asset from the first entity to the second entity.

Referring to FIG. 9, similar to 740 of process 700, at 900, a second client device (e.g., client device 260) associated with a second entity (e.g., entity 265) receives, from a first client device (e.g., client device 250) associated with a first entity (e.g., entity 255) that manages an asset (e.g., the asset Z of process 700), a token (e.g. the token T1 for the process 700) in response to a transfer of (or change in) management of the asset from the first entity to the second entity, wherein the token is assigned by an Information Manager (e.g. the Information Manager 240). At 905, similar to 755 of process 700, the second client device (e.g., client device 260) sends, to the Information Manager, the token and a request to modify and/or access information related to the asset, the request including an identification for the asset, wherein the token enables the Information Manager to authenticate the request (e.g., as at 760 in process 700).

Referring to FIG. 10, similar to 730 of process 700, at 1000, an Information Manager (e.g. the Information Manager 240) sends, to a first client device (e.g., client device 250) associated with a first entity (e.g., entity 255) while an asset (e.g., the asset Z of process 700) is managed by the first entity, a token (e.g. the token T1 of process 700) that is configured to authenticate one or more requests from a second entity (e.g., entity 265) to modify and/or access information related to the asset. At 1005, similar to 755 of process 700, the Information Manager receives, from a second client device (e.g., client device 260) associated with the second entity, the token and a request to modify and/or access the information related to the asset, the request including an identification for the asset. At 1010, similar to 760 of process 700, the Information Manager authenticates the request based on the token.

As will be appreciated, errors may occur in the database 243 (e.g. the NEAD 430 or NEAD 510) when asset data is added or modified due to errors in the asset identification itself (e.g., in a 12 digit hexadecimal string expressing a 48-bit MAC address for an asset that is a WiFi or BTLE AP) and/or in information provided for an asset such as civic location or geodetic location provided for an asset that corresponds to a WiFi, BTLE or small cell AP. For example, a human operator who inputs a 12 digit hexadecimal MAC address string may cause a typographical error, which results in the wrong asset address being recorded in the database 243 for the asset. Similarly, a human operator who inputs a civic location or a geodetic location for an asset that is a WiFi or BTLE AP may enter information incorrectly (e.g. may omit certain information, enter a street address or zip code incorrectly for a civic location or mistype a latitude or longitude coordinate for a geodetic location), which results in the wrong civic location or wrong geodetic location being recorded in the database 243 for the asset. An error in a MAC address or global cell ID will prevent use of an asset corresponding to a WiFi, BTLE or small cell AP to support emergency calls (e.g. as described in association with FIGS. 5 and 6) and will block additions of another asset with the same MAC address or global cell ID as the erroneous MAC address or global cell ID. Errors in civic and geodetic locations may cause PSAP dispatch to the wrong location for a UE that is making an emergency call.

To detect and correct errors in asset data stored in the database 243 and that are related to assets that are WiFi and BTLE APs, any of the following procedures 1-4 may be deployed as described below.

Procedure 1: when a user A provides an asset address (e.g. for a WiFi or BTLE AP) that matches an address provided previously by another user B, an Information Manager 240 may verify the address first with user A and then, if needed, with user B in order to determine whether the address provided by the user A or the address provided by the user B is correct or whether the addresses are both correct and refer to the same asset.

Procedure 2: a location server (e.g., location server 415, E-SMLC 508, E-SLP 532) anonymously collects and stores records for UEs, whose locations are obtained by the location server as part of normal network operation (e.g. including E911 calls). The records may include the final location estimates for the UEs, any asset addresses provided by each UE (e.g. for WiFi and/or BTLE AP assets visible to the UE) to assist location of the UE by the location server and an indication of which assets (e.g. WiFi and/or BTLE APs) were used by the location server to determine the final location for each UE. The records can be provided to the database 243 (e.g., the NEAD 430 or the NEAD 510), a manager of the database 243 (e.g. the Information Manager 240, the NEAM 435 or the NEAM 512) and/or some other entity to enable offline cross-checking of asset data versus the final location estimates. For example, the final location of a UE may be compared to the civic location and/or geodetic location that is stored in the database 243 (e.g. NEAD 430 or NEAD 510) for each asset (e.g. each WiFi or BTLE AP) that was provided by the UE to assist determination of the final location of the UE in order to determine whether the final location and the civic location and/or geodetic location are consistent with one another (e.g. are within 100 meters of one another). Civic and/or geodetic locations that are not found to be consistent with final UE locations may be flagged in the database 243 as being potentially incorrect with civic and/or geodetic locations that are so flagged for many UEs being considered as incorrect and possibly removed from the database 243.

Procedure 3: UEs that are at accurately known locations (e.g. accurate to 50 meters or less) may crowdsource asset addresses (e.g. addresses of WiFi and/or BTLE APs that are visible to the UEs at the known locations) to a location server (e.g., location server 415, E-SMLC 508, E-SLP 532). For example, this may occur as an extension of the 3GPP Minimization of Drive Test (MDT) feature. The location server may store the crowdsourced data which may include the asset addresses (e.g. for WiFi and/or BTLE APs) and the UE location or locations where each asset address was visible to a UE. The stored data may be evaluated at a later time by the location server or by another entity (e.g. the Information Manager 240, NEAM 435 or NEAM 512) to find and flag any asset whose civic location or geodetic location stored in the database 243 is not consistent with (e.g. not within 100 meters of) the known locations of the UEs that crowdsourced the address of this asset. Assets that are so flagged for at least a few UEs or many UEs may be considered to have incorrect civic and/or geodetic locations in the database 243 and may be removed from the database 243.

Procedure 4: when multiple asset addresses (e.g. MAC addresses for multiple WiFi and/or BTLE APs) are included in a query from a location server (e.g., location server 415, E-SMLC 508, E-SLP 532) to the database 243 (e.g. the NEAD 430 or NEAD 510) in order to locate a UE that reported all of the assets as being visible, the civic (or dispatchable) or geodetic locations for the assets returned by the database 243 in a response to the query may be compared to determine whether they are consistent with one another. This can be an offline activity in the location server, database 243 or Information Manager 240 (e.g. NEAM 435 or NEAM 512). The offline activity may be based on logging query/response data to the Information Manager 240 from the database 243. The offline activity may include comparing the dispatchable and/or geodetic locations for the assets (e.g. WiFi and/or BTLE APs) returned by the database 243 for each query to determine and flag any asset whose dispatchable and/or geodetic location is significantly different (e.g. more than 200 meters distant from) the civic and/or geodetic locations of all or most of the other assets in the same query. Assets so flagged may be regarded as having potentially incorrect civic and/or geodetic locations in the database 243 and may be removed from the database 243 if so flagged for a few or for many different queries. In some implementations, assets (e.g. WiFi and/or BTLE APs) that are reported as being visible by a UE may be provided to the database 243 in separate queries (e.g. with each query providing just one asset address), in which case each query to the database 243 may provide additional information (e.g. an identifier) to allow the database 243 to associate different queries whose asset addresses correspond to locating the same UE at the same time.

Figure 11:
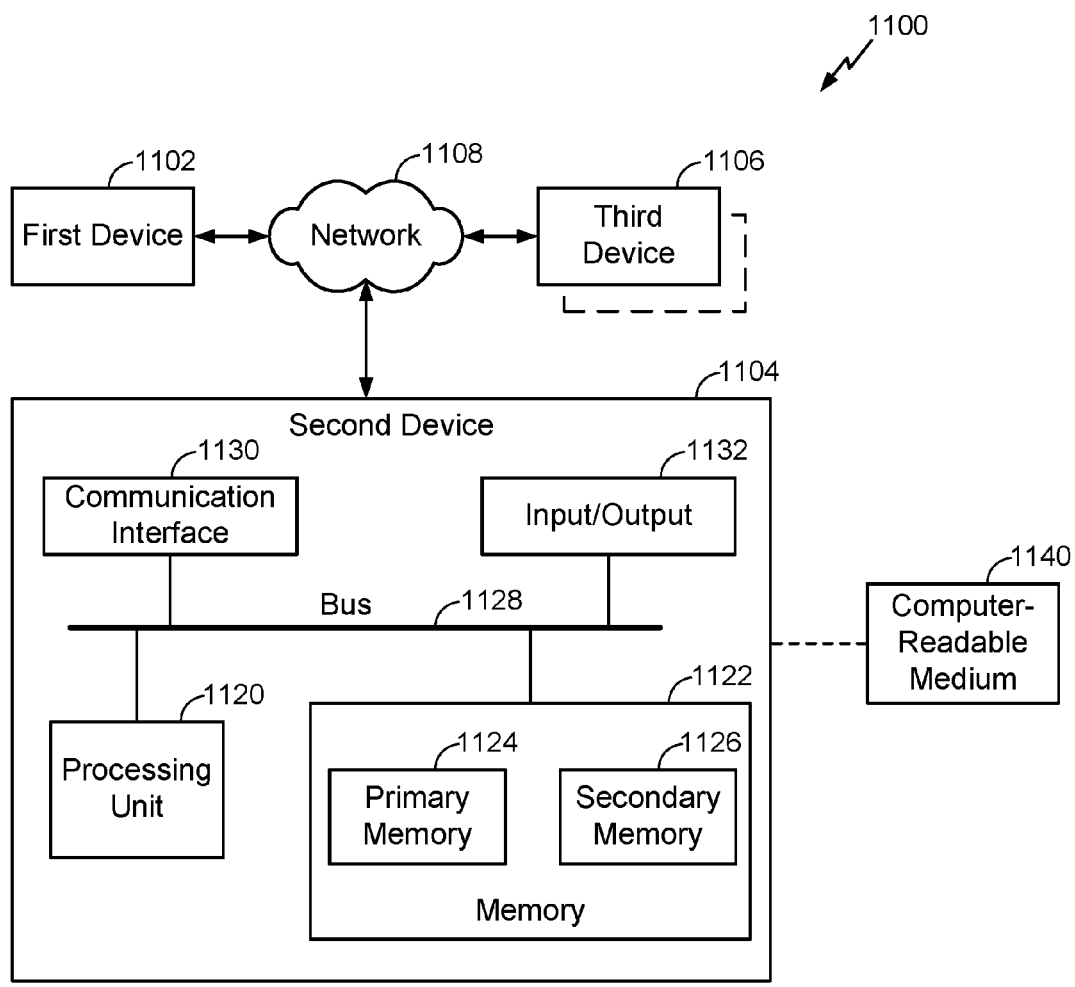
FIG. 11 is a schematic block diagram of an example computing platform in accordance with an embodiment of the disclosure.

FIG. 11 is a schematic diagram illustrating an example system 1100 that may include one or more devices configurable to implement techniques or processes described above, for example, in connection with FIGS. 2 and 4-10. System 1100 may include, for example, a first device 1102, a second device 1104, and a third device 1106, which may be operatively coupled together through a wireless communications network 1108. In an aspect, first device 1102, second device 1104 and/or third device 1106 may each comprise a server such as database 243, Information Manager 240, location server 415, gateway 420, NEAD 430, NEAM 435, E-SMLC 508, E-SLP 532, GMLC 506, LRF 530, NEAD 510, NEAM 512, SAS 554, or a client device such as client devices 250, 260 or 270. Also, in an aspect, wireless communications network 1108 may correspond to one or more of core network 230, access network 225 and Internet 235.

First device 1102, second device 1104 and third device 1106, as shown in FIG. 11, may be representative of any device, appliance or machine that may be configurable to exchange data over wireless communications network 1108. By way of example but not limitation, any of first device 1102, second device 1104, or third device 1106 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/system, a wireless communication service provider/system; or any combination thereof.

Similarly, wireless communications network 1108 may be representative of one or more communication links, processes, or resources configurable to support the exchange of data between at least two of first device 1102, second device 1104, and third device 1106. By way of example but not limitation, wireless communications network 1108 may include wireless or wired communication links, telephone or telecommunications systems, data buses or channels, optical fibers, terrestrial or space vehicle resources, local area networks, wide area networks, intranets, the Internet, routers or switches, and the like, or any combination thereof. As illustrated, for example, by the dashed lined box illustrated as being partially obscured by third device 1106, there may be additional like devices operatively coupled to wireless communications network 1108.

It is recognized that all or part of the various devices and networks shown in system 1100, and the processes and methods as further described herein, may be implemented using or otherwise including hardware, firmware, software, or any combination thereof. Thus, by way of example but not limitation, second device 1104 may include at least one processing unit 1120 that is operatively coupled to a memory 1122 through a bus 1128. Processing unit 1120 is representative of one or more circuits configurable to perform at least a portion of a data computing procedure or process. By way of example but not limitation, processing unit 1120 may include one or more processors, controllers, microprocessors, microcontrollers, application specific integrated circuits, digital signal processors, programmable logic devices, field programmable gate arrays, and the like, or any combination thereof.

Memory 1122 is representative of any data storage mechanism. Memory 1122 may include, for example, a primary memory 1124 and/or a secondary memory 1126. Primary memory 1124 may include, for example, a random access memory, read only memory, etc. While illustrated in this example as being separate from processing unit 1120, it should be understood that all or part of primary memory 1124 may be provided within or otherwise co-located/coupled with processing unit 1120.

Secondary memory 1126 may include, for example, the same or similar type of memory as primary memory 1124 or one or more data storage devices or systems, such as, for example, a disk drive, an optical disc drive, a tape drive, a solid state memory drive, etc. In certain implementations, secondary memory 1126 may be operatively receptive of, or otherwise configurable to couple to, a computer-readable medium 1140. Computer-readable medium 1140 may include, for example, any non-transitory medium that can carry or make accessible data, code or instructions for one or more of the devices in system 1100. Computer-readable medium 1140 may also be referred to as a storage medium.

Second device 1104 may include, for example, a communication interface 1130 that provides for or otherwise supports the operative coupling of second device 1104 to at least wireless communications network 1108. By way of example but not limitation, communication interface 1130 may include a network interface device or card, a modem, a router, a switch, a transceiver, and the like.

Second device 1104 may include an input/output device 1132. Input/output device 1132 is representative of one or more devices or features that may be configurable to accept or otherwise introduce human or machine inputs, or one or more devices or features that may be configurable to deliver or otherwise provide for human or machine outputs. By way of example but not limitation, input/output device 1132 may include an operatively configured display, speaker, keyboard, mouse, trackball, touch screen, data port, etc.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative embodiments of the present disclosure, it should be noted that various changes and modifications could be made herein without departing from the scope of the embodiments of the present disclosure as defined by the appended claims. The functions, steps and/or actions of the method claims in accordance with the embodiments of the disclosure described herein need not be performed in any particular order. Furthermore, although elements of the embodiments of the present disclosure may be described or claimed in the singular, the plural is contemplated unless limitation to the singular is explicitly stated.

What is claimed is:

1. A method of operating a first client device associated with a first entity, comprising:
   sending, to an Information Manager, a request to modify and/or access information related to an asset that is managed by the first entity, the request including an identification for the asset;
   receiving, from the Information Manager, a token that is configured to authenticate a request from a second entity to modify physical device attribute information of the asset and/or identification information of the asset, wherein the physical device attribute information of the asset includes a location of the asset, and wherein the identification information of the asset includes a Media Access Control (MAC) address of the asset and/or a global cell identifier (ID) of the asset; and
   transferring the token to a second client device associated with the second entity in response to a transfer of management of the asset from the first entity to the second entity.

2. The method of claim 1, wherein the asset is a WiFi access point, Bluetooth beacon or small cell base station.

3. The method of claim 2, wherein the token is configured to authenticate a request from the second entity to add, change, retrieve or delete a civic location of the asset, a geodetic location of the asset, information for a managing entity of the asset, information for an owning entity of the asset, an authorization to transfer management of the asset or some combination thereof.

4. The method of claim 3, wherein the Information Manager is a National Emergency Address Manager (NEAM).

5. The method of claim 1, wherein the token is uniquely assigned by the Information Manager to the asset.

6. The method of claim 1, wherein the token is a number, a name or a character string.

7. The method of claim 1, wherein a copy of the token is maintained by the Information Manager.

8. The method of claim 1, further comprising:
   pre-authorizing with the Information Manager a transfer of management of the asset prior to receiving the token.

9. The method of claim 1, wherein the transfer of management of the asset from the first entity to the second entity corresponds to a change in ownership of the asset from the first entity to the second entity.

10. A method of operating a first client device associated with a first entity, comprising:
    receiving, from a second client device associated with a second entity that manages an asset, a first token in response to a transfer of management of the asset from the second entity to the first entity, wherein the first token is assigned by an Information Manager and is configured to authenticate one or more requests from the first entity to modify physical device attribute information of the asset and/or identification information of the asset, wherein the physical device attribute information of the asset includes a location of the asset, and wherein the identification information of the asset includes a Media Access Control (MAC) address of the asset and/or a global cell identifier (ID) of the asset; and
    sending, to the Information Manager, the first token and a request to modify and/or access information related to the asset, the request including an identification for the asset, wherein the first token enables the Information Manager to authenticate the request.

11. The method of claim 10, wherein the asset is a WiFi access point, Bluetooth beacon or small cell base station.

12. The method of claim 11, wherein the request to modify and/or access information related to the asset comprises a request to add, change, retrieve or delete a civic location of the asset, a geodetic location of the asset, information for a managing entity of the asset, information for an owning entity of the asset, authorization to transfer management of the asset, or some combination thereof.

13. The method of claim 10, wherein the first token is uniquely assigned by the Information Manager to the asset.

14. The method of claim 10, wherein the first token is a number, a name or a character string.

15. The method of claim 10, further comprising:
    receiving a second token that replaces the first token in response to the sending, wherein the first entity is pre-authorized to transfer management of the asset to a third entity.

16. The method of claim 10, further comprising:
    revoking the first token without obtaining a second token in response to the sending, wherein the first entity is not pre-authorized to transfer management of the asset to a third entity.

17. The method of claim 10, wherein the transfer of management of the asset from the second entity to the first entity corresponds to a change in ownership of the asset from the second entity to the first entity.

18. A method of operating an Information Manager, comprising:
    sending, to a first client device associated with a first entity while an asset is managed by the first entity, a token that is configured to authenticate one or more requests from a second entity to modify physical device attribute information of the asset and/or identification information of the asset, wherein the physical device attribute information of the asset includes a location of the asset, and wherein the identification information of the asset includes a Media Access Control (MAC) address of the asset and/or a global cell identifier (ID) of the asset;

receiving, from a second client device associated with the second entity, the token and a request to modify and/or access the information related to the asset, the request including an identification for the asset; and authenticating the request based on the token.

19. The method of claim 18, wherein the sending sends the token in response to a request from the first client device that requests modification and/or access to the information related to the asset when managed by the first entity, the request from the first client device including an identification for the asset.

20. The method of claim 18, wherein the asset is a WiFi access point, Bluetooth beacon or small cell base station.

21. The method of claim 20, wherein the request to modify and/or access information related to the asset comprises a request to add, change, retrieve or delete a civic location of the asset, a geodetic location of the asset, information for a managing entity of the asset, information for an owning entity of the asset, authorization to transfer management of the asset, or some combination thereof.

22. The method of claim 21, wherein the Information Manager is a National Emergency Address Manager (NEAM).

23. The method of claim 18, wherein the token is uniquely assigned by the Information Manager to the asset.

24. The method of claim 18, wherein the token is a number, a name or a character string.

25. The method of claim 18, wherein a copy of the token is maintained by the Information Manager.

26. The method of claim 18, further comprising:
pre-authorizing with the first entity a transfer of management of the asset prior to sending the token.

27. The method of claim 18, wherein the request is received in response to a transfer of management of the asset from the first entity to the second entity.

28. The method of claim 27, wherein the transfer of management of the asset from the first entity to the second entity corresponds to a change in ownership of the asset from the first entity to the second entity.

29. The method of claim 18, further comprising:
notifying the first entity of the authenticating.

30. The method of claim 18, further comprising:
updating the information related to the asset in a database based on the request in response to the authenticating.

* * * * *